(12) United States Patent
Underwood et al.

(10) Patent No.: US 12,450,681 B2
(45) Date of Patent: Oct. 21, 2025

(54) GRAPHICS PROCESSING

(71) Applicant: Arm Limited, Cambridge (GB)

(72) Inventors: Mark Underwood, Cambridge (GB);
Wing-Tsi Henry Wong, Lund (SE);
Olof Henrik Uhrenholt, Lomma (SE);
Philip Carlos Garcia, Austin, TX (US);
Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 222 days.

(21) Appl. No.: 18/478,131

(22) Filed: Sep. 29, 2023

(65) Prior Publication Data
US 2025/0111464 A1     Apr. 3, 2025

(51) Int. Cl.
*G06T 1/20*     (2006.01)

(52) U.S. Cl.
CPC ...................... *G06T 1/20* (2013.01)

(58) Field of Classification Search
None
See application file for complete search history.

(56) References Cited

U.S. PATENT DOCUMENTS

| | | |
|---|---|---|
| 7,023,437 B1 | 4/2006 | Voorhies et al. |
| 11,127,188 B1 | 9/2021 | Uhrenholt |
| 11,132,835 B1 | 9/2021 | Uhrenholt |
| 2003/0225898 A1 | 12/2003 | Saika |
| 2005/0195197 A1 | 9/2005 | Wolfe |
| 2015/0032969 A1 | 1/2015 | Bratt |
| 2015/0220341 A1 | 8/2015 | Ohannessian, Jr. |
| 2017/0148204 A1 | 5/2017 | Hakura et al. |
| 2017/0212764 A1 | 7/2017 | Lyberis |
| 2019/0088009 A1 | 3/2019 | Forey et al. |
| 2020/0379909 A1 | 12/2020 | Uhrenholt |
| 2021/0192672 A1* | 6/2021 | Mccrary ................... G06T 1/20 |
| 2022/0020108 A1 | 1/2022 | Uhrenholt |
| 2022/0101479 A1 | 3/2022 | Alla et al. |
| 2024/0320896 A1* | 9/2024 | Ma ........................ G06T 15/005 |

FOREIGN PATENT DOCUMENTS

GB     2595025 A     11/2021

OTHER PUBLICATIONS

U.S. Appl. No. 18/894,496, filed Sep. 24, 2024, "Graphics Processing".
Combined Search and Examination Report under Sections 17 and 18(3), dated Feb. 4, 2025, GB Application No. GB2414257.2, 5 pages.
Non-final Office Action dated Jun. 9, 2025, U.S. Appl. No. 18/478,657, filed Sep. 29, 2023.

(Continued)

*Primary Examiner* — Haixia Du
(74) *Attorney, Agent, or Firm* — Pearl Cohen Zedek Latzer Baratz LLP

(57) ABSTRACT

When performing a sequence of rendering jobs, rendering tasks for separate rendering jobs are permitted to overlap within the graphics processor's processing (shader) cores. A record is maintained of which rendering tasks are currently being processed by the graphics processor's processing (shader) cores which record can then be used to enforce any data (processing) dependencies between different rendering jobs.

19 Claims, 9 Drawing Sheets

(56) References Cited

OTHER PUBLICATIONS

Response to Office Action dated Jun. 18, 2025, U.S. Appl. No. 18/478,657, filed Sep. 29, 2023.
Non-final Office Action dated May 19, 2025, U.S. Appl. No. 18/478,078, filed Sep. 29, 2023.
Combined Search and Examination Report under Sections 17 and 18(3), dated Mar. 26, 2024, GB Patent Application No. GB2315009.7.
U.S. Appl. No. 18/478,657, filed Sep. 29, 2023, "Graphics Processing".
U.S. Appl. No. 18/478,121, filed Sep. 29, 2023, "Graphics Processing".
U.S. Appl. No. 18/478,078, filed Sep. 29, 2023, "Graphics Processing".
U.S. Appl. No. 18/483,972, filed Oct. 10, 2023, "Graphics Processing".
Non-final Office Action dated Aug. 18, 2025, U.S. Appl. No. 18/478,121, filed Sep. 29, 2023.
Final Office Action dated Aug. 19, 2025, U.S. Appl. No. 18/478,657, filed Sep. 29, 2023.
Response to Office Action dated Sep. 19, 2025, U.S. Appl. No. 18/478,078, filed Sep. 29, 2023.

* cited by examiner

GRAPHICS PROCESSING

BACKGROUND

The technology described herein relates to performing graphics processing, and in particular to the operation of graphics processors when performing a sequence of rendering jobs, e.g. to generate one or more outputs, e.g. frames, e.g. for display.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

(It will be appreciated that rasterisation-based rendering as described above is merely one approach for producing a render output and other types of rendering operation exist that may be implemented by a graphics processor including, for example, ray tracing or hybrid ray tracing rendering operations.)

One form of graphics processing uses so-called "tile-based" rendering. In tile-based rendering, the two-dimensional render output (i.e. the output of the rendering process, which may be an output frame to be displayed but could be an "intermediate" output or other suitable render target, as will be explained further below) is rendered as a plurality of smaller area regions, usually referred to as rendering "tiles", which rendering tiles can then be (and are) rendered separately. The rendered tiles are then recombined to provide the complete render output, e.g. frame, e.g. for display.

In such arrangements, the render output, e.g. frame to be displayed, is typically divided (by area) into regularly-sized and shaped rendering tiles (they are usually e.g., squares or rectangles), but this is not essential and other arrangements are possible.

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

Modern graphics processors typically include one or more processing (shader) cores, that execute, inter alia, programmable processing stages, commonly referred to as "shaders", of a graphics processing pipeline that the graphics processor implements.

A graphics processor processing (shader) core is thus a processing unit that performs processing by running (typically small) programs for each "work item" in an output to be generated. In the case of generating a graphics output, such as a render target, such as a frame to be displayed, a "work item" in this regard may be a sampling position, e.g., in the case of a fragment shader, but could also be a vertex, or a ray, for example, depending on the graphics processing (shading) operation in question. In the case of compute shading operations, each "work item" in the output being generated will be, for example, the data instance (item) in the work "space" that the compute shading operation is being performed on.

In order to execute shader programs, a graphics processor will include an appropriate execution unit or units (circuit or circuits) for that purpose. The execution unit(s) will include programmable processing circuit(s) for executing shader programs (the "shaders" of graphics processing pipeline).

The actual data processing operations that are performed by the execution unit when executing that shader program are usually performed by respective functional units of the execution unit, which may include (but are not limited to) a texture mapping unit that is configured to perform certain texturing operations. Thus, the functional units will in response to and as required by instructions in a (shader) program being executed perform appropriate data processing operations.

In addition to the programmable execution unit that executes the shader programs (using its associated functional units) the graphics processor processing (shader) core may typically also include one or more essentially fixed-function (hardware) stages for implementing certain stages of the graphics processing (rendering) pipeline. These fixed-function stages can be used to handle certain fragment "frontend" processing operations for setting-up the fragment shader program (which may include, for example, primitive list reading, resource allocation, vertex fetching, rasterisation, early depth/stencil testing, but various arrangements would be possible, e.g. depending on the particular configuration of the graphics processing pipeline) and also certain post-shader actions, such as late depth/stencil testing or tile write-out.

Thus, the graphics processor processing (shader) core is operable and configured to implement an instance of the graphics processing pipeline for processing a given rendering task with the processing (shader) core operable and configured to load the required data for setting up the shader program and then executing the desired fragment shader program to perform the actual rendering operation. The output of the rendering task is then written out accordingly.

Typically there may be many parallel processing (shader) cores within a graphics processor such that the graphics processor is capable of simultaneously processing plural different rendering tasks in parallel. Thus, in a tile-based rendering system, respective tasks for processing different tiles may be issued to different processing (shader) cores such that the tiles can be rendered in parallel. This can therefore provide a more efficient graphics processor operation.

Thus, when the graphics processor receives a command to generate a particular render target, i.e. by performing a render pass whose output is the desired render target (and which render pass may generally comprise one or more rendering jobs, each rendering job comprising a respective set of rendering tasks to be processed for the desired render target), the command is then processed within a suitable command processing unit (e.g. a command stream frontend/job manager) of the graphics processor to identify the rendering jobs to be performed, and a suitable (fragment) task iterator then schedules the processing of the respective sets of rendering tasks to be performed for the rendering jobs for the render pass accordingly, with the rendering tasks being allocated to the available processing (shader) cores for processing.

Although described above in relation to a single render pass, it will be appreciated that multiple render passes may generally be performed as part of generating a single output, e.g. a single frame, e.g. for display.

For example, a given rendering job within a render pass may generate a "final" output, e.g. a frame, e.g. for display. However, in general, there may be multiple rendering jobs and multiple render passes that are performed in order to generate a given final output (frame). Thus, a given rendering job (within a given render pass) may, e.g., generate an "intermediate" output, such as a "render to texture" output (i.e. a texture), that is then used by a subsequent rendering job (e.g., within the next render pass, although it could also be used by another rendering job within the same render pass) when generating the final output, e.g. frame. This can provide a more efficient graphics processor operation, e.g. compared to simply generating the final output (frame) in full by a single rendering job (render pass).

Similarly, it will be appreciated that most graphics processing applications do not require only a single output, e.g. frame, to be generated in isolation, but rather will typically require a sequence of outputs, e.g. frames, to be generated, e.g. for a continued display.

The graphics processor when generating one or more frames may thus generally be operable and configured to perform a sequence of render passes, with each render pass comprising one or more rendering jobs for generating a respective (overall) output for that render pass. The different render passes in a sequence of render passes being performed may in some cases be independent of each other (e.g. where they relate to different frames, or exclusively write to different (data buffers). However, it is also often the case that at least some of the different render passes in a sequence of render passes being performed are related to each other. For example, this may be the case when one render pass generates a "render to texture" or other suitable "intermediate" output that is then consumed by the next render pass. There may also be dependencies between rendering jobs within a particular render pass, e.g. where a "compute" job performs calculations based on a render output produced by a preceding fragment job.

Thus, in a given sequence of rendering jobs to be performed, there may be certain data (processing) dependencies between rendering jobs that if not enforced may lead to certain artefacts in the final rendered output.

The Applicants, however, believe that there remains scope for improvements to the operation of graphics processor when performing a sequence of rendering jobs, and wherein there may be certain data (processing) dependencies between different rendering jobs in the sequence of rendering jobs being performed.

BRIEF DESCRIPTION OF THE DRAWINGS

A number of embodiments of the technology described herein will now be described by way of example only and with reference to the accompanying drawings, in which.

DETAILED DESCRIPTION

Figure 1:
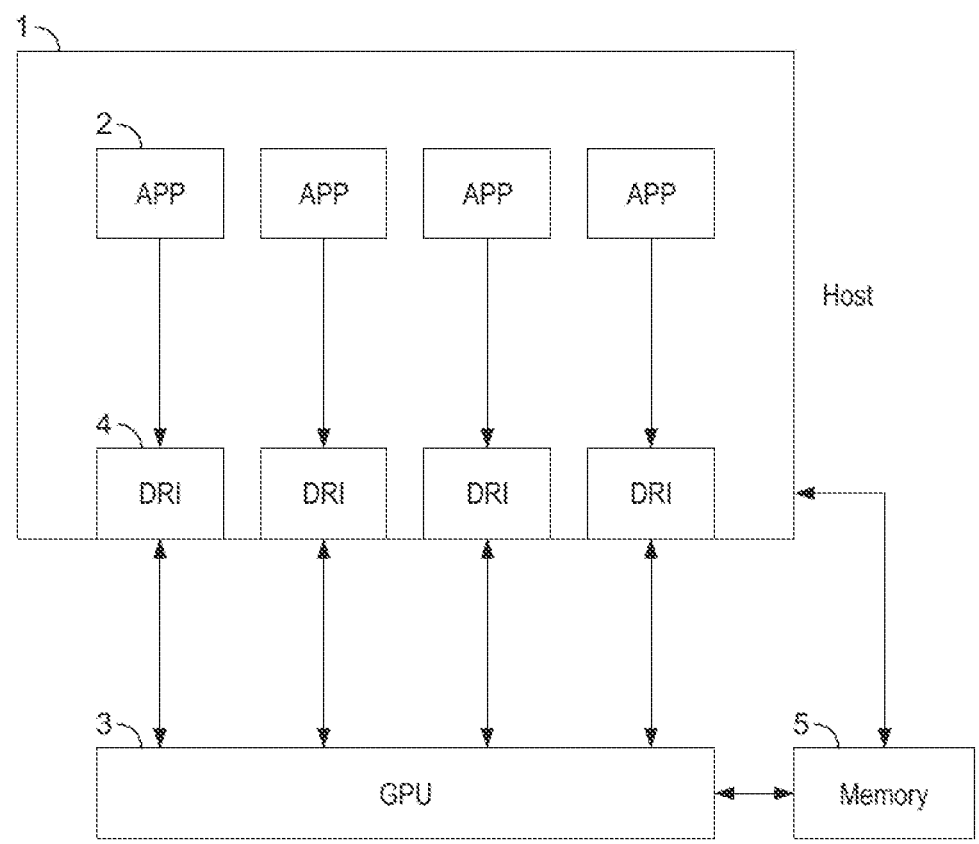
FIG. 1 shows an exemplary computer graphics processing system.

A first embodiment of the technology described herein comprises a method of operating a graphics processor when performing a sequence of rendering jobs, wherein each rendering job in the sequence of rendering jobs comprises a respective set of one or more rendering tasks to be processed to generate an overall output for the rendering job, and wherein at least some processing of a rendering task for a later rendering job in the sequence of rendering jobs may depend on processing of a rendering task for an earlier rendering job in the sequence of rendering jobs, the method comprising:

when performing a sequence of rendering jobs, wherein the sequence of rendering jobs is performed in serial order such that all of the rendering tasks for an earlier rendering job in the sequence of rendering jobs are issued for processing before any of the rendering tasks for a later rendering job in the sequence of rendering jobs:

issuing rendering tasks for a later rendering job in the sequence of rendering jobs to a set of one or more processing cores of the graphics processor for processing concurrently with rendering tasks for an earlier rendering job in the sequence of rendering jobs; and maintaining a record of which rendering tasks are currently being processed by the set of processing cores of the graphics processor; and when processing a rendering task for a later rendering job, determining using the record of which rendering tasks are currently being processed by the set of processing cores of the graphics processor whether processing of the rendering task for the later rendering job depends on any of the rendering tasks that are currently being processed by the set of processing cores of the graphics processor, and controlling processing of the rendering task for the later rendering job based on such determination.

A second embodiment of the technology described herein comprises a graphics processor comprising:

a set of one or more processing cores;

a task issuing circuit operable to control the issuing of rendering tasks to the plural processing cores for processing; and a control circuit operable and configured to:

when the graphics processor is performing a sequence of rendering jobs, wherein the sequence of rendering jobs is performed in serial order such that all of the rendering tasks for an earlier rendering job in the sequence of rendering jobs are issued for processing before any of the rendering tasks for a later rendering job in the sequence of rendering jobs, and wherein each rendering job in the sequence of rendering jobs comprises a respective set of one or more rendering tasks to be processed to generate an overall output for the rendering job, wherein the processing of a rendering task for a later rendering job in the sequence of rendering jobs may depend on the processing of a rendering task for an earlier rendering job in the sequence of rendering jobs:

control the operation of the graphics processor to:

cause the task issuing circuit to issue rendering tasks for a later rendering job in the sequence of rendering jobs to a set of one or more processing cores of the graphics processor for processing concurrently with rendering tasks for an earlier rendering job in the sequence of rendering jobs; and the control circuit further configured to:

maintain a record of which rendering tasks are currently being processed by the set of processing cores of the graphics processor; and determine using the record of which rendering tasks are currently being processed by the set of processing cores of the graphics processor whether processing of a rendering task for the later rendering job depends on any of the rendering tasks that are currently being processed by the set of processing cores of the graphics processor, and control processing for the rendering task for the later rendering job based on such determination.

The technology described herein relates generally to the operation of a graphics processor when performing a sequence of rendering jobs, in particular in the situation where there may be certain data (processing) dependencies between different rendering jobs in the sequence of rendering jobs that is being performed.

For instance, the graphics processor may be, and in an embodiment is, operable and configured to perform a sequence of render passes, wherein each render pass in the sequence of render passes is associated with, and generates, a respective output. Each render pass may in turn comprise one or more rendering jobs for processing (part of) the respective output for the render pass.

As mentioned above, however, the output for a given render pass may be a "final" output, e.g. a frame for display, but may also be an "intermediate" output (e.g. a "render to texture" output) that is then used by a later render pass in the sequence of render passes for generating its output. Likewise, the processing of a particular "final" output, e.g. frame, may in some cases re-use (at least some) processing of an earlier "final" output (e.g. frame). Thus, there may be certain data (processing) dependencies that should be enforced between rendering jobs for different render passes. Likewise, there may be certain data (processing) dependencies that should be enforced between different rendering jobs within the same render pass, e.g. where a "compute" job relates to an output produced by a preceding fragment rendering job, for instance, such that the "compute" job uses the data generated by the fragment rendering job. The technology described herein particularly relates to such situations where there are possible data (processing) dependencies between rendering jobs that may need to be enforced.

Each of the rendering jobs in the sequence of rendering jobs being performed in the technology described herein can be (and is) subdivided into a respective set of rendering tasks that is to be processed for an overall output (render target) for the render pass for which the rendering job is being performed for. For example, a render pass may, and generally will, include one or more fragment rendering jobs for producing a respective render output (e.g. frame) for the render pass, wherein the rendering tasks within a fragment rendering job generate respective portions (e.g. regions) of the overall output (frame). However, a particular render pass may also include various other types of rendering jobs such as "compute" jobs for performing calculations in respect of the (same) render output produced by a previous fragment rendering job within the same render pass (and wherein the rendering tasks for "compute" job may therefore, and in an embodiment do, perform such calculations in respect of certain portions (e.g. regions) of the overall output (render target)). That is, the rendering jobs within a given render pass may, and generally do, relate to the same overall output (e.g. frame), and the rendering tasks within each rendering job therefore in an embodiment relate to rendering operations (e.g. fragment shading in the case of a fragment shading job, or calculations in the case of a "compute" job) performed in respect of the same overall output for the render pass.

The graphics processor includes a set of one or more, and in an embodiment plural, processing (shader) cores that are operable to and configured to process these rendering tasks for the overall output (render target) for the rendering job. In embodiments, at least some, and in some cases all, of the rendering jobs, comprise a plurality of rendering tasks, which plural rendering tasks for the rendering job can be performed separately, e.g., and in an embodiment, in parallel across plural processing (shader) cores of the graphics processor. Each rendering task associated with a respective rendering job may therefore, and in an embodiment does, correspond to a respective portion of the overall output (render target) for the rendering job. Each rendering task thus in an embodiment corresponds to a respective instance of a graphics processing workload that can be (and is to be) executed by a respective processing (shader) core of the graphics processor.

Thus, the data (processing) dependencies between rendering tasks for different rendering jobs will typically (and in an embodiment) relate to only a portion of the overall output (e.g. the dependencies that can be handled by the technology described herein are typically data (processing) dependencies relating to certain regions of an overall render output being generated). Thus, when a rendering task within a particular rendering job performs processing relating to a certain region of a render output (e.g. where the rendering task writes data to a particular location within a data buffer (render target) corresponding to that region), any rendering tasks for later rendering jobs that require data relating to that (same) region of the render output may then have a data (processing) dependency on the earlier rendering task that needs to be managed. (On the other hand the later rendering tasks may not have any data (processing) dependencies on earlier rendering tasks that relate strictly to different regions of the render output.)

For example, and in an embodiment, the output (render target) for each rendering job is subdivided into a plurality of rendering tasks each corresponding to a respective "tile" or sub-region into which the overall render output (e.g. frame) associated with the rendering job has been subdivided for rendering purposes, i.e. for a tile-based rendering system, such that the individual rendering tasks to be processed for a particular rendering job generate respective portions (e.g. sub-regions) of the overall output (render target) associated with the rendering job. Therefore, the rendering tasks into which the rendering job subdivided may, e.g., and in an embodiment do, correspond to (individual) rendering tiles into which the output (render target) for the rendering job has been subdivided for rendering purposes (and any references herein to rendering "tasks" may in embodiments be taken to refer to rendering "tiles"). Various arrangements would however be possible for defining suitable sets of rendering tasks to be performed within a given rendering job for generating a respective output for that rendering job.

Thus, the graphics processing workload within a given rendering job may, and in an embodiment does, involve issuing a plurality of (separate) rendering tasks (e.g. tiles) for processing, with each rendering task generating a respective render output (which is a respective portion of an overall render output associated with the rendering job), which rendering tasks may then be processed, e.g. in parallel, by respective processing (shader) cores of the graphics processor. The respective output(s) for individual rendering tasks can then be, and in an embodiment are, stored in a suitable intermediate buffer (e.g. a tile buffer in a tile-based rendering system), and once the processing of a rendering task is finished, the (final) output (or outputs) of that rendering task can then be written out accordingly, e.g. to a respective data buffer (render target) that the rendering job writes to, at which point the processing of the rendering task is complete.

Once all of the rendering tasks for a rendering job have completed their processing, and the respective outputs been written out appropriately, the rendering job is thus finished.

The graphics processor then continues in this way for the next and further rendering jobs in the sequence of rendering jobs being performed until all of the rendering jobs in the sequence of rendering jobs have finished (or until the application requiring the graphics processing stops the current sequence of rendering jobs, e.g. to generate a different sequence of outputs (e.g. frames).

The graphics processing workload for each render pass in a sequence of render passes being performed is therefore typically similar, with each render pass generally including a similar set of rendering jobs, and each rendering job including a similar set of rendering tasks to be performed (but with the different render passes producing different outputs (render targets)). The rendering tasks that are to be performed for a rendering job may be, and in an embodiment are, issued for processing in a set, e.g. predefined, order, but the processing of the rendering tasks can be (and is) allocated to the available processing (shader) cores of the graphics processor appropriately so that at least some processing of rendering tasks for different rendering jobs is performed concurrently, e.g. in parallel, across the available processing (shader) cores. In general, the time to completion for different rendering tasks may be different and so the rendering tasks for different rendering jobs (for different render passes) may therefore complete out of order.

The allocation of rendering tasks to processing cores may thus be, and in an embodiment is, generally performed to try to balance the processing between the available processing (shader) cores of the graphics processor, and ensure higher utility of the available processing (shader) cores. Thus, a suitable task issuing circuit (task iterator) of the graphics processor may suitably control the scheduling and allocation of rendering tasks to processing (shader) cores in order to try to allocate rendering tasks to available processing (shader) cores, and hence increase utilisation of the processing (shader) cores.

However, the present Applicants recognise that there may still be instances within a particular render pass, or rendering job within a render pass, where there may be relatively lower utilisation of the available processing (shader) cores.

For example, this may particularly the case towards the end of a rendering job where there may be relatively fewer rendering tasks remaining to be completed for the rendering job compared to the number of available processing (shader) cores. Similar situations can also exist at the start of the rendering job where the workload may be focussed in the fragment "frontend", without requiring full processing (shader) core utilisation. Other situations of possible low processing (shader) core utilisation may include, for example, where the rendering job is itself relatively smaller and does not include enough rendering tasks to fully utilise all of the available processing (shader) cores.

A 'rendering job' is thus a self-contained chunk of processing work including one or more rendering tasks relating to a particular render output and there may be certain data (processing) dependencies between different rendering jobs in a sequence of rendering jobs that is being performed. A rendering job may however be part of a larger 'render pass' that comprises a plurality of different types of rendering jobs relating to the same render output. As mentioned above, the data (processing) dependencies between rendering jobs may therefore be data (processing) dependencies that exist between rendering jobs for different render passes, but could also be data (processing) dependencies between rendering jobs within the same render pass. In any case, in some more traditional graphics processing arrangements a strict (hard) processing barrier is enforced between such rendering jobs such that no rendering tasks for a later processing job are issued for processing until all of the rendering tasks for an earlier processing job on which it depends have completed their processing, e.g. in case there are any potential data (processing) dependencies between the rendering jobs that need to be enforced, for example where a rendering job uses data generated by one or more previous rendering jobs.

Thus, if the rendering jobs in the sequence of rendering jobs were performed strictly one-after-another, i.e. with strict (hard) processing barriers between different rendering jobs, and hence no overlap between the processing of different rendering jobs in the processing (shader) cores (as may be done in some more traditional graphics processing arrangements), there may be significant instances of relatively lower processing (shader) core utilisation, e.g., and in particular, where the graphics processor is finishing off processing for an earlier rendering job but can't yet start to issue and processing rendering tasks for a subsequent rendering job due to the strict processing barrier between the rendering jobs.

To address this, and provide an improved graphics processor performance, the technology described herein thus provides a novel mechanism to safely allow processing for separate rendering jobs to overlap in the graphics processor processing (shader) cores, i.e. such that rendering tasks for different rendering jobs are able to run concurrently. For example, and in some embodiments of the technology described herein, rendering tasks for different rendering jobs are able to run concurrently (e.g. in parallel) across different processing (shader) cores of the graphics processor.

In some embodiments, the graphics processor may be configured such a particular processing (shader) core can only execute rendering tasks from a single fragment context (i.e. rendering job). In that case, when separate rendering jobs (potentially for separate render passes) are to be overlapped in the manner of the technology described herein, the rendering tasks from different rendering jobs may be (and will be) issued to different processing (shader) cores for processing. However, in general, rendering tasks for different rendering jobs could also run concurrently within the same processing (shader) core, e.g. so long as the graphics processor is appropriately configured with a mechanism to guarantee forward progress of the earlier rendering job so that any potential data (processing) dependencies can be suitably resolved. Various arrangements would be possible in this regard.

Because the graphics processor is operable to process rendering tasks for separate rendering jobs concurrently, this then means that the graphics processor (task issuing circuit) can start to issue rendering tasks for a second, later rendering job in a sequence of rendering jobs being performed for processing, and the processing (shader) cores can start processing those rendering tasks, without having to wait for all of the rendering tasks for the first rendering job to have completed their processing. Thus, the technology described herein advantageously avoids a strict (hard) processing barrier between separate rendering jobs.

In particular, as will be explained further below, the technology described herein provides a mechanism that allows the graphics processor, in such situations where rendering tasks for first and second rendering jobs are being performed concurrently, to determine whether a particular rendering task to be processed has an unmet data (processing) dependency on an earlier rendering task that means that processing of the rendering task should be stalled until the earlier rendering task has completed its processing. According to the technology described herein, as will be explained further below, this is done by maintaining a record of which rendering tasks are currently being processed by the set of processing cores of the graphics processor, and using this record to determine, on a per rendering task basis, which (if any) rendering tasks that are currently being processed may result in "active" data (processing) dependencies, such that processing of (later) rendering tasks can be controlled as required to enforce any such "active" data (processing) dependencies that may exist between rendering tasks for different rendering jobs.

In this respect, it will be appreciated that although rendering tasks may generally complete out of order (and in any order), because the rendering jobs are issued for processing in strict serial order, i.e. such that all of the rendering tasks for an earlier rendering job in the sequence of rendering jobs are issued for processing before any of the rendering tasks for a later (i.e. the next) rendering job in the sequence of rendering jobs, if the graphics processor has started to process rendering tasks for a later rendering job, it can thus be ensured that if a particular rendering task for an earlier rendering job does not appear in the record of rendering tasks that are currently being processed by the set of processing cores of the graphics processor, the rendering task for the earlier rendering job must have already completed its processing (or otherwise was never issued for processing, which may, e.g., be the case if the rendering task can be eliminated upfront).

That is, at the point at which a particular rendering task within a rendering job is to be issued for processing, it must be the case that any earlier rendering tasks for any earlier rendering jobs must already have been issued to a processing (shader) core for processing (since the rendering jobs are issued in serial order), and so if any such rendering tasks for any of the earlier rendering jobs than the rendering job for which rendering tasks are currently being issued are not currently being processed by the processing (shader) cores, those tasks must have already completed their processing (or otherwise been eliminated), such that the rendering task for the earlier rendering job cannot result in any active data (processing) dependencies.

According to the technology described herein, the record of which rendering tasks are currently being processed by the set of processing cores of the graphics processor can thus be (and is) used when processing rendering tasks for a later rendering job to determine whether processing of a particular rendering task potentially depends on processing of any others of the rendering tasks that are currently being processed by the set of processing cores of the graphics processor (i.e. rendering tasks for earlier rendering jobs on which the rendering job that is currently issuing rendering tasks may have a data (processing) dependency but which have not yet completed their processing so that the different rendering jobs are running concurrently) (and hence to determine whether or not the rendering task for the later rendering job can safely be processed (i.e. without risking introducing artefacts)).

Appropriate control of the processing of the rendering task for the later rendering job can thus be performed based on such determination, e.g. to enforce any data (processing) dependencies, as required.

In this way, the graphics processor can, and in an embodiment does, ensure that any data (processing) dependencies between different rendering jobs are respected (i.e. even when the processing of rendering tasks for different rendering jobs overlaps within the graphics processor's processing (shader) cores such that there is a risk and possibility when not applying the technology described herein that a rendering task for the second, later rendering job may progress beyond a corresponding rendering task for the first, earlier rendering job upon which it depends, thus introducing potential artefacts to the output of the second, later rendering job).

The effect and benefit of this is that the processing of (at least some) rendering tasks for a second, later rendering job in a sequence of rendering jobs being performed can be, and in an embodiment is, performed concurrently with processing of rendering tasks for a first, earlier rendering job in the sequence of rendering jobs, but in such a manner to still ensure a 'safe' graphics processing operation (i.e. without risking introducing artefacts to the render output(s) generated by the earlier or later rendering jobs as a result of any such data (processing) dependencies not being properly respected).

For example, the rendering tasks within each rendering job in the sequence of rendering jobs being generated are according to the technology described herein in an embodiment still issued for processing by the graphics processor processing (shader) cores in a set, desired rendering order, e.g. in the normal manner for issuing such rendering tasks, such that all of the rendering tasks for the first, earlier rendering job are issued prior to issuing any rendering tasks for the second, later rendering job. However, as mentioned above, some of the rendering tasks for the first rendering job may complete relatively quickly, whilst others of the rendering tasks for the first rendering job may take longer to complete.

The technology described herein thus allows the graphics processor when performing a sequence of rendering jobs to start issuing and processing rendering tasks for a second, later rendering job in the sequence of rendering jobs relatively earlier, without having to wait for all of the rendering tasks for a first, earlier rendering job in the sequence of rendering jobs to have completed their processing.

This then allows processing for the first and second rendering jobs to overlap within the graphics processor processing (shader) cores, which can thereby reduce potential instances of low processing (shader) core utilisation as if the graphics processor is running out of rendering tasks for the first rendering job, such that there are not enough rendering tasks for the first rendering job to fully utilise the available processing (shader) cores, the graphics processor according to the technology described herein can now start to issue rendering tasks for the second, later rendering job to the graphics processor processing (shader) cores for processing concurrently with the remaining rendering tasks for the first, earlier rendering job using the available processing (shader) cores (that would otherwise be idle if a strict (hard) processing barrier were enforced between rendering jobs). This can therefore improve processing (shader) core utilisation, and thereby provide a more efficient (e.g. quicker) graphics processor operation.

For example, as alluded to above, in some more traditional graphics processing arrangements, a strict (hard) processing barrier may be enforced between different rendering jobs such that the graphics processor is unable to issue rendering tasks for the second, later rendering job until all of the rendering tasks for the first, earlier rendering job have completed their processing. This is because (as also mentioned above) there may be, and typically will be, various data (processing) dependencies between the different rendering jobs, for example, such that an output (or part thereof) generated by a first, earlier rendering job is to be used as an input for processing by a second, later rendering job. In such cases, a rendering task for a second, later rendering job in a sequence of rendering jobs being performed may thus need to use data from a data buffer that is (potentially) written to by a corresponding rendering task for a previous (a first, earlier) rendering job in the sequence of rendering jobs.

This data (processing) dependency then means that certain rendering tasks for the second, later rendering job cannot (safely) be performed until the processing of corresponding rendering tasks for the first, earlier rendering job has completed, i.e. until it is ensured that the required data buffer (render target) has been updated, as needed, with the data that is required to be used for the second, later rendering job. Hence, when a rendering task for a second, later rendering job requires access to a data buffer that may be (or is) written to by a first, earlier rendering job, the rendering task for the second rendering job should not then be performed until the processing of any corresponding rendering task for the first rendering job upon which the rendering task for the second rendering job may have a data (processing) dependency has completed.

Thus, whilst the different rendering tasks within a given (the same) rendering job are generally separate of one another, such that they can be (and are) processed concurrently (e.g. in parallel) across the graphics processor processing (shader) cores without problem, the processing of a rendering task for a later rendering job in a sequence of rendering jobs to be performed can, and often will, depend on the processing of a corresponding rendering task (or in some cases multiple rendering tasks) from an earlier (e.g., and typically, the previous) rendering job in the sequence of rendering jobs, such that the rendering task for the later rendering job should not be performed until its dependency on the rendering task for the earlier rendering job has resolved (i.e. until the rendering task for the earlier rendering job has completed its processing, and written its final output, so that any data buffer that the later rendering job may need to access can be updated as required by the earlier rendering job, e.g. such that the correct data is then available in the data buffer for the rendering task for the later rendering job).

For instance, an example of this would be when a particular rendering job in a sequence of rendering jobs being performed reads from a data buffer (render target) that a corresponding earlier rendering job in the sequence of rendering jobs writes to (a so-called 'read after write' dependency). A typical example of this may be when performing graphics processing texturing operations where the later rendering task reads from a portion of a texture buffer that can be (or is) written to by a corresponding rendering task for an earlier rendering job (e.g. a fragment rendering job for an earlier render pass in a sequence of render passes being performed).

In that case, a given rendering task for the later rendering job may need to read a portion of a data buffer (render target) that is to be populated by a corresponding rendering task for the same portion of the overall render output, e.g. a corresponding region ("tile") of the render output, for the earlier rendering job. In such case, the rendering task for the later rendering job should not therefore read data from the buffer until the corresponding rendering task for the earlier rendering job has completed, i.e. until that portion of the buffer has been updated (as needed) by the corresponding rendering task for the earlier rendering job.

Another example would be where some state information needs to be passed between rendering jobs, such as variable rate shading parameters that are to be re-used between (fragment) rendering jobs for different render passes, but wherein the state information or set of parameters for a rendering job for a later render pass is or can be determined by the processing for a rendering job for an earlier render pass (i.e. by executing a suitable shader program as part of the earlier rendering job). Such state information will typically be read in (e.g. as a variable rate shading parameter image) relatively earlier in the fragment frontend (e.g.

through the fragment shader endpoint). In that case, the graphics processor may need to stall processing the later rendering task within the fragment shader endpoint until the earlier rendering task has completed its processing so that the updated state information is available for use by the later rendering task.

A further example might be for transaction elimination mechanisms that can be used to save memory bandwidth by avoiding writing a render output (e.g. tile) to memory when it can be determined that what has just been rendered is identical to what is already stored in memory. For example, the graphics processor may be operable and configured to write out a suitable signature (which signature may, e.g., and in embodiments does, comprise a suitable checksum of the output values (e.g. a cyclic redundancy check (CRC)) at the same time as writing the render output to memory. When performing the next rendering job (e.g. for the next render pass), a corresponding signature can thus be generated, and checked appropriately against the stored signature to determine whether the render output for the current rendering job is identical to what is currently stored in memory, in which case the writing out for the current rendering job can be omitted. Again, although the signature is not used until write out, in order to hide latency the reading of the signatures (which may, e.g., and in an embodiment are, provided in the form of a 'CRC buffer' storing the respective checksum (CRC) values) is typically performed relatively earlier in the fragment frontend (e.g. through the fragment shader endpoint), and so the graphics processor may need to stall processing of a rendering task for the later rendering job within the fragment shader endpoint until any rendering tasks for the earlier rendering job on which the rendering task depends have completed their processing and written out such a signature.

Various other examples would however be possible where the graphics processor, at some point during the graphics processing workload for a particular rendering job, needs to access some data (e.g. from a respective data buffer storing that data) that may have been generated or updated during the processing for another (earlier) rendering job in the sequence of rendering jobs being performed.

Enforcing a strict (hard) processing barrier between rendering jobs, as in some more traditional graphics processing arrangements, thus ensures that any rendering tasks for later rendering jobs that may be dependent on an output of a first, earlier rendering job are not (and cannot be) issued until the processing of all of the rendering tasks for the first rendering job is completed, and thus ensures a safe graphics processing operation. However, as mentioned above, this can mean that there are significant periods of low processing (shader) core utilisation, e.g., and particularly, towards the end of a rendering job, where there may be relatively fewer rendering tasks to complete so that some of the processing (shader) cores are idle waiting for the other processing (shader) cores to complete the processing of their allotted rendering tasks.

In contrast, by providing a mechanism for tracking the completion status of rendering tasks within a rendering job, the technology described herein then allows the data (processing) dependencies between different rendering jobs to be managed in a finer-grained manner, e.g., and in an embodiment, at the level of rendering tasks within a rendering job, rather than only for the rendering job as a whole, so that the graphics processor is operable and configured to start to issue and process rendering tasks for later rendering jobs that are dependent on the earlier rendering job relatively earlier, without waiting for all of the processing for the earlier rendering job to have completed.

The technology described herein thus advantageously avoids a strict (hard) processing barrier between rendering jobs, and thereby allows processing for different rendering jobs to overlap within the graphics processor processing (shader) cores. Further, this is done in such a manner to ensure that there is still a safe graphics processing operation, in particular by ensuring that any data (processing) dependencies between rendering tasks for the different rendering jobs are respected. Thus, the management of any such data (processing) dependencies is effectively moved into the graphics processor processing (shader) core, and performed under control of the graphics processor, rather than enforcing a strict (hard) processing barrier between rendering jobs in the graphics processor command stream.

In other words, according to the technology described herein, when performing a sequence of rendering jobs, the graphics processor does not need to (and does not) wait for all rendering tasks for a first, earlier rendering job in the sequence of rendering jobs to have completed their processing before starting to issue and process rendering tasks for a second, later rendering job in the sequence of rendering jobs, thereby increasing graphics processor performance (e.g. in terms of throughput and processing (shader) core utilisation), but this is done in such a manner to still maintain safe (i.e. artefact-free) graphics processing operation by controlling the processing to enforce any required data (processing) dependencies between the rendering jobs.

In this regard, an additional effect and benefit of tracking the completion status of rendering tasks in the manner of the technology described herein is that in many cases any possible data (processing) dependencies between rendering tasks for different rendering jobs will already have naturally resolved by the time the rendering task for the later, potentially dependent rendering job is issued for processing. That is, in many cases, there will be no need to stall the processing for the majority of the rendering tasks for the second, later rendering job. Being able to issue and process the rendering tasks for the second, later rendering job relatively earlier (and thus enforcing any data (processing) dependencies relatively later) can therefore provide a significant performance improvement as in many typical cases the rendering tasks for the later rendering job can be performed immediately, without having to stall (control) the processing as it is will often by the case that there will be no outstanding data (processing) dependencies by the time the rendering task for the later rendering job is issued for processing.

Thus, the technology described herein provides a mechanism to ensure that rendering tasks can be stalled when it is necessary to do so, thus ensuring a safe graphics processing operation, but the present Applicants have recognised that in typical graphics processing applications it may not actually be required to stall the processing for a majority of the rendering tasks (and in such cases it may rather simply be necessary to check the 'task completion status' data structure to confirm that the processing does not need to be stalled, but the rendering task can then be performed as normal without having to further control (e.g. stall) its processing).

For instance, and in an embodiment, the rendering tasks are issued for processing in a set, e.g. predefined, order, which order is generally consistent between different rendering jobs (and different render passes). For example, in the case where the rendering tasks correspond to respective rendering tiles into which the overall output (frame) is subdivided for rendering, the rendering tasks (tiles) within each rendering job may generally be, and in an embodiment are, issued for processing in a certain, e.g. predefined order (e.g. in Z/Morton order), which order is in an embodiment the same for the corresponding rendering tasks for each rendering job in the sequence of rendering jobs being performed.

Thus, during a first rendering job, the processing may start by issuing a first rendering task for the first rendering job (which first rendering task in an embodiment corresponds to a first region of the render output associated with the first rendering job), and may then proceed to issue a second rendering task for the first rendering job, and so on, with the rendering tasks for the first rendering job being issued according to the desired order. Towards the end of the first rendering job the processing (shader) cores may start to run out of rendering tasks for the first rendering job, and so, as mentioned above, the graphics processor according to the technology described herein is operable to start to issue rendering tasks for the next rendering job for processing (i.e. a second, later rendering job). The rendering tasks for the second rendering job are however in an embodiment issued in the same order as the corresponding rendering tasks were issued for the first rendering job (e.g. starting again from a corresponding 'first' rendering task for the second rendering job (which first rendering task for the second rendering job in an embodiment corresponds to the same render output region as the equivalent first rendering task for the first rendering job (but for the render output for the second rendering job)), and then proceeding to issue the corresponding 'second' and further rendering tasks according to the (same) certain, e.g. predefined order as for the first rendering job).

The effect of this is that it will typically (only) be later rendering tasks for the first rendering job whose processing potentially overlaps with processing of earlier rendering tasks for the second rendering job.

The present Applicants recognise, however, that in a majority of cases, the data (processing) dependencies between rendering jobs will (only) be between certain, corresponding ones of the rendering tasks for the different rendering jobs, i.e. rendering tasks that relate to the same or similar portions of the overall render output (e.g. the same region of the frame). That is, and for example, the processing of the first rendering task for the second rendering job may depend on the processing of the corresponding (equivalent) first rendering task for the first rendering job (e.g. the rendering task for rendering the (same) corresponding "tile" during the second rendering job), but often (and typically) will not depend on the processing of any other rendering tasks (e.g. for any other rendering tiles). That is, the data (processing) dependency may relate only to a particular portion of a data buffer (render target) produced by an earlier rendering job. Thus, by issuing rendering tasks for the different rendering jobs in the same consistent order, in many cases, any data (processing) dependencies will already have resolved by the time the rendering task for the later rendering job is issued for processing as the processing of the corresponding rendering task for the earlier rendering job will likely have completed by that point. So, in many cases there may be no need to stall the processing of a particular rendering task at all as any potential data (processing) dependency it has on a corresponding rendering task for an earlier rendering job will naturally resolve itself by the time that rendering task is issued for processing. However, the technology described herein provides a 'fallback' mechanism to ensure that any required data (processing) dependencies that are not resolved can be (and are) respected to ensure safe graphics processor operation.

That is, the technology described herein provides a mechanism for issuing potentially dependent rendering tasks relatively earlier, such that their processing can potentially be performed concurrently with rendering tasks from an earlier rendering job, but also recognises that by doing this, and managing dependencies within rendering jobs (rather than at the level of the rendering jobs as a whole), the data (processing) dependencies will in many cases already be met by the time a potentially dependent rendering task is issued for processing.

In this way, in addition to providing a fuller utilisation of the available processing (shader) cores, the technology described herein may, e.g., and in an embodiment does, also provide a significant improvement in graphics processing performance, in particular in terms of processing speed/throughput (or in other words, reduced latency) whilst still ensuring that the processing of the rendering task for the later rendering job can be stalled (if needed) to ensure any dependences are respected. Another possible benefit is that because different rendering jobs that may require the same data can be performed closer together, this can potentially increase data locality and hence improve memory access efficiency.

The technology described herein may therefore provide various benefits compared to other possible approaches.

As mentioned above, the technology described herein maintains a record of which rendering tasks are currently being processed by the set of processing cores of the graphics processor.

In embodiments, each of the graphics processor processing (shader) cores within the graphics processor is operable and configured to maintain its own respective local record (e.g. list) of the rendering tasks that it is currently processing. The respective record for a processing (shader) core may thus be sized to match the (maximum) number of rendering tasks that can be processed by the processing (shader) core in question. Thus, in embodiments, the graphics processor includes plural processing cores, and wherein each processing core maintains its own record of which rendering tasks it is currently processing.

In this respect, a particular effect and benefit of the approach according to the technology described herein is therefore that there is no need to track the completion status of each (and every) individual rendering task within each rendering job (which may require relatively larger area data structures to do so) since it is recognised that only a limited number of rendering tasks can possible be processed at any given time, i.e. based on the processing capacity of the processing (shader) cores, and that it may therefore be sufficient to only track which rendering tasks are currently being processed whilst still being able to enforce any data (processing) dependencies between rendering tasks for different rendering jobs (and the technology described herein provides a mechanism to do this).

Thus, in some embodiments, the graphics processor maintains a number of separate records, one for each processing (shader) core, and these together constitute the overall record of which rendering tasks are currently being processed by the set of processing cores of the graphics processor. In that case, each processing (shader) core could maintain its own local record. Other arrangements would, however, be possible. For example, in another embodiment, the task issuing circuit (task iterator) maintains the record or records of which rendering tasks are currently being processed by the set of processing cores of the graphics processor.

The record of which rendering tasks are currently being processed by the set of processing (shader) cores of the graphics processor may thus be, and in an embodiment is, updated as and when the processing (shader) cores complete rendering tasks and new rendering tasks are allocated to the processing (shader) cores for processing.

For instance, in embodiments where each processing (shader) core maintains its own local record of the rendering tasks that it is currently processing, the processing (shader) core can then (and does) update that record accordingly as and when the processing (shader) core completes a rendering task and/or receives a new rendering task from the task issuing circuit (task iterator) for processing. On the other hand, if the record is maintained by the task issuing circuit (task iterator), the task issuing circuit (task iterator) can then update the record (to add a new active rendering task) as and when it issues a rendering task to a processing (shader) core, with the record then being further updated (to remove an active rendering task) when a processing (shader) core signals to the task issuing circuit (task iterator) that it is completed a rendering task (e.g., which may be done as part of the normal signalling from the processing (shader) cores to the task issuing circuit (task iterator) to indicate that a processing (shader) core is available to receive a new rendering task).

The record of which rendering tasks are currently being processed by the set of processing (shader) cores of the graphics processor can then be, and is, used to enforce potential data (processing) dependencies between rendering tasks for different rendering jobs that may overlap within the set of processing (shader) cores.

In particular, when processing a rendering task for a later rendering job, the record of which rendering tasks are currently being processed by the set of processing (shader) cores of the graphics processor can be consulted and used to determine whether or not the rendering task has a potential active data (processing) dependency (i.e. a data (processing) dependency on a rendering task that is currently being processed and that may therefore need to be enforced). If it is determined that there is an active data (processing) dependency on a rendering task that has not yet completed its processing, at least some processing of the rendering task can thus be (and in an embodiment is) stalled, e.g. to enforce the data (processing) dependency, as required.

This operation to determine whether a particular rendering task has any "active" data (processing) dependencies on any other rendering tasks that are currently being processed can be done in various suitable ways, as desired.

For example, according to the technology described herein, it is in an embodiment first identified, for a rendering task to be processed for a given rendering job in a sequence of rendering jobs being performed, whether the rendering job has any potential data (processing) dependencies on an earlier (e.g. the previous) rendering job in the sequence of rendering jobs for which one or more rendering tasks may still be in-flight.

Thus, in embodiments, the determining whether processing of the rendering task for the later rendering job depends on any of the rendering tasks that are currently being processed by the set of processing cores of the graphics processor comprises: identifying whether the later rendering job has a potential dependency on any earlier rendering job for which one or more rendering tasks are currently being processed.

The identification of potential data (processing) dependencies between rendering jobs can be performed in any suitable and desired manner.

For example, for each rendering job, there may be a respective set of (output) data buffers (render targets) that the rendering job (potentially) writes to. Likewise, there may be respective set of (input) data buffers that the rendering job reads from. API requirements typically mandate that it is declared in advance which inputs/outputs are potentially used for a given rendering job (or at least for a particular render pass including the rendering job). Thus, it is typically declared in advance which data buffers are potentially used for a given rendering job, as well as the corresponding memory access permissions for those data buffers for the rendering job in question.

Thus, for a given rendering job, if there is no overlap between the set of data buffers that the rendering job needs to access (i.e. read from and/or write to) and the set of (output) data buffers that an earlier (the previous) rendering job (potentially) writes to, there are no potential data (processing) dependencies, and so the rendering job can be safely performed alongside the earlier rendering job. On the other hand, if there is any overlap between the set of data buffers that the later rendering job may need to access and the set of data buffers that an earlier (the previous) rendering job (potentially) writes to, this means that the later rendering job has a potential data (processing) dependency on the earlier rendering job that will need to be managed appropriately (and this can accordingly be done using the techniques of the technology described herein).

Thus, in embodiments, identifying whether there is a potential data dependency between the rendering task for the second rendering job and the rendering task for the first rendering job comprises determining whether the rendering task for the second rendering job needs to access any data buffers that are potentially written to by the rendering task for the first rendering job. For example, and in an embodiment, identifying whether there is a potential data dependency between the rendering task for the second rendering job and the rendering task for the first rendering job comprises determining whether the rendering task for the second rendering job needs to access any data buffers that are potentially written to by the rendering task for the first rendering job. This can be done, for example, by detecting whether the later rendering job potentially reads data from any data buffer (render target) that any of the earlier rendering jobs potentially write data to (i.e. there is a so-called 'read-after-write' dependency).

The determining as to whether there is overlap between the set of data buffers that the rendering job needs to access (i.e. read from and/or write to) and the set of (output) data buffers that an earlier (the previous) rendering job (potentially) writes to can be performed in any suitable and desired manner. For example, this could be done by storing a bitmap representing which data buffers are used by a rendering job (or render pass), and then comparing the respective bitmaps for different rendering jobs to determine any potential overlap. Other arrangements would however be possible. For instance, rather than explicitly comparing all of the possible data buffers, the determination as to whether there is any overlap between the data buffers between rendering jobs could be performed using an appropriate set probability test, such as a Bloom filter (relying on the fact that false positives are acceptable so long as if there is a possible dependency the processing is stalled until the earlier task has completed its processing).

Various other arrangements would however be possible in this regard.

The operation to determine whether a particular rendering task has any "active" data (processing) dependencies on any other rendering tasks that are currently being processed, including the identification of potential data (processing) dependencies between rendering jobs is in an embodiment done by a task issuing circuit (task iterator) of the graphics processor (that communicates with all of the processing (shader) cores).

Thus, when it is needed to identify whether a rendering job (for which a given rendering task is to be processed) has a potential data (processing) dependency on any other (earlier) rendering jobs, the task issuing circuit (task iterator) is in an embodiment configured and operable to check this, in particular by checking whether there is any overlap between the set of data buffers that the rendering job may need to access and the set of data buffers that are accessed by any of the earlier rendering job(s).

Thus, the task issuing circuit (task iterator) is in an embodiment operable and configure to, for each rendering job that is currently in-flight, store suitable information for checking for any overlap between the sets of data buffers used by different rendering jobs. As mentioned above, this may be done using a set probability test, in which case the information that is stored for each rendering job may use a suitable hash function (or hash functions) that is calculated over suitable identifiers for the data buffers in the set of available data buffers. The hash function may for example be used to implement a suitable Bloom filter, with the bits that are set in the Bloom filter being determined using one or more hash functions. Thus, if the Bloom filters for two rendering jobs are the same, this may indicate that there is possible overlap between the data buffers that will be accessed by the rendering jobs (and hence a potential data (processing) dependency). On the other hand, if the Bloom filters are different, this may indicate that there is no overlap. In an embodiment, this check is performed in a probabilistic manner such that there is no possibility for false negatives (but some possibility for false positives), and a Bloom filter may therefore be particularly suited in this regard. Other arrangements would however be possible in this regard.

To further facilitate this dependency determining operation, each rendering job may, and in an embodiment does, have a unique ("age") identifier that the task issuing circuit (task iterator) can use to determine which rendering jobs are currently being processed. Thus, the task issuing circuit (task iterator) can use the unique ("age") identifiers to determine which processing (shader) cores are currently processing rendering tasks for which of the rendering jobs. In this respect, it will be appreciated that a rendering task for a (later) rendering job will typically only depend on earlier rendering jobs in the sequence of rendering jobs. Thus, if it can be identified that any processing (shader) cores are only processing rendering tasks for the same or later rendering jobs in the sequence of rendering jobs as the rendering task in question, in an embodiment no further determinations are made in respect of those processing (shader) cores, e.g. since it can be determined based on the age of the rendering job alone that there can be no possible active data (processing) dependency. In this respect, whilst certain embodiments are described in relation to first and second rendering jobs it will be appreciated that the approach according to the technology described herein may generally extend to any number of rendering jobs that may be run concurrently.

Thus, when processing a particular rendering task for a given rendering job, the technology described herein may generally involve a step of identifying whether the rendering job for which the particular rendering task is to be processed has any potential data (processing) dependencies on any other, earlier rendering jobs that are concurrently being processed.

When it can be identified that there are no potential data (processing) dependencies between the rendering job for which the particular rendering task is to be processed and any other, earlier rendering jobs that are concurrently being processed, the graphics processor can simply process the rendering task, and there is no need for any additional control to ensure data (processing) dependencies are respected (since there are no data (processing) dependencies that would need to be respected).

On the other hand, if there is a potential data (processing) dependency between the rendering job for which the particular rendering task is to be processed and any other, earlier rendering jobs that are concurrently being processed, additional control may be required, e.g. to stall at least some processing of the rendering task until any rendering tasks for any other, earlier rendering jobs on which the processing depends have completed their processing.

That is, it will be appreciated that a particular rendering task for a later rendering job may generally, and typically, only depend on processing of one or more rendering tasks for an earlier rendering job (rather than the earlier rendering job as a whole). Thus, so long as the particular rendering task or tasks on which the processing of the later rendering task depends have completed their processing, it is still safe to process the later rendering task, even if there are other rendering tasks for the earlier rendering job that have not yet completed their processing.

Thus, in the case that a potential data (processing) dependency is identified between the rendering job for which the particular rendering task is to be processed and any other, earlier rendering jobs that are concurrently being processed, the graphics processor in an embodiment then further identifies which (if any) of the rendering tasks for an earlier rendering job that is still being processed the rendering task is potentially dependent on (and in particular whether the rendering task is dependent on any rendering tasks that are currently being processed (i.e. have not yet completed their processing), e.g. as determined from the record of which rendering tasks are currently being processed).

In this respect, it will be appreciated that a rendering task for a later rendering job may in some cases depend (only) from the corresponding, equivalent rendering task for an earlier rendering job (e.g. the same rendering tile, corresponding to same region of the screen), or on a certain set of rendering tasks for the earlier rendering job that is known in advance, and in some embodiments the graphics processor is configured such that this is the case.

In principle, however, a rendering task for a later rendering job could depend on any rendering tasks for an earlier rendering task, and this can also be managed appropriately so long as this can be suitably identified. For example, it is typically not known in advance (in the API) which inputs (images) will be read from, or which parts of those inputs (images) will be read from, and a rendering job can generally specify a large set of inputs from which it may potentially read. A shader program during execution can also choose (for various reasons) whether or not to actually read from the set of inputs that it has access to.

Thus, in embodiments, when processing a rendering task for a later rendering job, it is determined during the processing, e.g., and in an embodiment, when a memory access is to be performed, not only whether a potential data (processing) dependency on an earlier rendering job exists but also which rendering task or tasks for the earlier rendering job the current rendering task may potentially depend on.

This is in an embodiment done by determining whether the later rendering task accesses the same portion or region of a particular data buffer (render target) that is also accessed by the earlier rendering task. For example, as mentioned above, the data (processing) dependencies may generally be between rendering tasks relating to the same or similar render output regions, and so the determination of whether a particular rendering task has a data (processing) dependency on an earlier rendering task is in an embodiment based on whether the rendering tasks for different processing jobs relate to the same or similar render output regions as each other. Thus, in embodiments, identifying whether the rendering task for the later rendering job depends on any of the one or more rendering tasks that are currently being processed for the earlier rendering job comprises identifying whether the rendering task for the later rendering job potentially accesses a same portion of a data buffer that a rendering task for the earlier rendering job also potentially accesses.

For instance, any given memory access to a data buffer (render target) will typically access only a certain portion of that data buffer (render target). For instance, the portion of the data buffer (render target) that will be accessed may typically be, and in an embodiment is, specified in terms of an address identifying that portion of the data buffer (render target), which address may, e.g., be provided in terms of an "offset" or set of coordinates. Thus, by comparing the address, e.g. offset, specified for the different rendering tasks, it is possible to then determine whether or not there is an actual data (processing) dependency) between the rendering tasks that needs to be enforced, and this is in an embodiment therefore what is done.

Thus, the record of which rendering tasks are currently being processed in an embodiment also stores for each rendering task an indication of which portion of which data buffers (render targets) may be accessed by that rendering task. This indication can then be used accordingly, in the case that a potential data (processing) dependency is identified between rendering jobs, to check which (if any) of the other rendering tasks being processed for the earlier rendering job the rendering task for the later rendering job depends on.

If the graphics processor determines that the rendering task for a later rendering job does not depend on any of the rendering tasks currently being processed, this then means that the rendering task can safely be processed. Whereas, if the graphics processor identifies that there are certain "active" data (processing) dependencies between rendering tasks for different rendering jobs, an additional control (e.g. stalling) is performed to ensure data (processing) dependencies are respected.

The controlling processing of the rendering task may be performed in any suitable and desired manner, e.g. so long as any data (processing) dependencies between rendering jobs are respected.

For example, in some embodiments, the controlling processing may involve (the task issuing circuit (task iterator)) controlling issuing of the rendering task to a processing (shader) core.

Thus, when it is determined that a rendering task that is to be issued for processing has a potential dependency on a rendering task that is currently being processed, the control may be to stall issuing the new rendering task until the rendering task on which it depends has completed its processing. In that case, the processing (shader) cores may be operable and configured to signal to the task issuing circuit (task iterator) when the rendering task has completed its processing to allow the new rendering task to be issued for processing (e.g., and in an embodiment, as part of the normal signalling that is performed to indicate that a processing (shader) core is ready to receive a new rendering task).

In embodiments, however, the controlling processing may involve issuing (or allocating) the new rendering task to a respective processing (shader) core, e.g. as normal, but then stalling processing of the rendering task within the respective processing (shader) core, e.g., and in an embodiment, by implementing a suitable processing "block", to ensure the processing of rendering task is stalled before any memory access to which the data (processing) dependency relates. This then means that at least some processing of the rendering task may be performed (e.g. in a fragment frontend of the graphics processing pipeline) with the processing only being stalled at the point at which it is necessary to do so. This therefore beneficially then allows some processing to be performed whilst waiting for the data (processing) dependency to be met.

Thus, the operations described above to determine whether a particular rendering task has any "active" data (processing) dependencies on any other rendering tasks that are currently being processed is in an embodiment performed by a processing (shader) core, when processing a rendering task for a particular rendering job, signalling to the task issuing circuit (task iterator) that a check needs to be made as to whether the rendering task in question has any "active" data (processing) dependencies that need to be enforced before continuing processing the rendering task. Thus, the processing (shader) core when processing a rendering task in an embodiment signals to the task issuing circuit (task iterator) when such determination needs to be made, and this signalling triggers the determination to be made in respect of the rendering task in question.

Thus, in embodiments, as mentioned above, the determining whether processing of the rendering task for the later rendering job depends on any of the rendering tasks that are currently being processed by the set of processing cores of the graphics processor is performed by a task issuing circuit of the graphics processor that controls the issuing of rendering tasks to the processing cores. In that case, the determining is in an embodiment performed at the point at which a data (processing) dependency may apply, e.g. in respect of a memory access. Thus, when the rendering task requires a memory access, the processing core at that point in an embodiment messages the task issuing circuit to determine whether the memory access depends on any of the rendering tasks that are currently being processed by the set of processing cores of the graphics processor, with the task issuing circuit returning a result of the determination to the processing core to control processing of the rendering task.

The task issuing circuit (task iterator) is thus operable and configured to, check the respective record or records of which rendering tasks are currently being processed by the respective processing (shader) cores in order to determine whether the rendering task for which it is being determined whether there is any "active" data (processing) dependency has such an "active" data (processing) dependency on any of the rendering tasks that are currently being processed. For example, when a respective record of the rendering tasks is maintained by or on behalf on each processing (shader) core of the rendering tasks it is currently processing (whether these records are maintained by the task issuing circuit (task iterator) or locally to the processing (shader) cores), task issuing circuit (task iterator) is thus operable and configured to, check the respective records of rendering tasks maintained by or on behalf of the respective processing (shader) cores in order to determine whether the rendering task for which it is being determined whether there is any "active"

data (processing) dependency has such an "active" data (processing) dependency on any of the rendering tasks that are currently being processed. For example, the task issuing circuit (task iterator) should generally, and in an embodiment does, at least check the respective local records that are maintained by or on behalf of any of the processing (shader) cores that are currently processing rendering tasks for a particular rendering job on which there is a potential data (processing) dependency in order to determine whether the rendering task in question has an "active" data (processing) dependency. It will be appreciated that the task issuing circuit (task iterator) may however not need to, and in an embodiment does not, check the respective records for any processing (shader) cores that are processing any other rendering jobs on which there are no potential data (processing) dependencies, which may, e.g., include any processing (shader) cores that are only processing rendering tasks for the same rendering job as the rendering task for which the dependency is being checked, or that are only processing rendering tasks for later rendering jobs in the sequence of rendering jobs being performed, as the dependency will generally only relate to earlier rendering jobs in the sequence.

If the task issuing circuit (task iterator) can determine that there are no "active" data (processing) dependencies that need to be enforced, this can then be signalled back to the processing (shader) core and the processing (shader) core can then, and in an embodiment does, continue processing the rendering task.

On the other hand, if the task issuing circuit (task iterator) determines that there is a "active" data (processing) dependency that needs to be enforced relating to one or more (other) rendering tasks that are currently being processed by the processing (shader) cores of the graphics processor, the task issuing circuit (task iterator) in that case should, and therefore in an embodiment does, cause the processing (shader) core to stall processing of the rendering task in question. This could be done by the task issuing circuit (task iterator) explicitly signalling to the processing (shader) core that there is an "active" dependency. Alternatively, and in an embodiment, this could be done by causing the processing (shader) core to wait until a signal is received from the task issuing circuit (task iterator) indicating that there are "active" data (processing) dependencies that need to be enforced (which signal then triggers the processing (shader) core to continue processing the rendering task).

In this case, the rendering task for the earlier rendering job that is causing the "active" dependency that the rendering task is in an embodiment indicated as causing an "active" dependency. For example, the rendering task that is causing the "active" data (processing) dependency may then be, and in an embodiment is, associated with a suitable indication (e.g. a "blocking" flag, e.g. bit) that it is currently blocking one or more other rendering tasks. This indication may be stored in association with the rendering task within the record, for example. When the rendering task that is causing the data (processing) dependency completes its processing, this indication may therefore trigger a suitable signal (e.g. a broadcast) to the other processing (shader) cores to allow them to check whether any blocked rendering tasks can now be released. Thus, in embodiments, whenever a rendering task for which such indication is provided completes (such that the record can be, and is, updated to remove that rendering task from the list of rendering tasks currently being processed by a processing (shader) core), the presence of such indication triggers a suitable signalling to other processing (shader) cores that are currently stalling processing of a rendering task to trigger those processing (shader) cores to perform a dependency check to see if the stall can be released.

The record(s) of which rendering tasks are currently being processed by a processing (shader) core may thus also store other suitable state information, as desired. For example, as mentioned above, the record may also indicate for each active rendering task whether the rendering task is currently being "blocked" by another rendering task on which it has a data (processing) dependency (which could be a rendering task within the same processing (shader) core but typically may be a rendering task within a different processing (shader) core).

Thus, in an embodiment, when the rendering task that is causing the data (processing) dependency completes its processing, this information can then be, and in an embodiment is, broadcast to all of the processing (shader) cores (or at least any processing (shader) cores that are currently implementing a processing block) to allow any such processing blocks to be lifted, such that any rendering tasks that were blocked based on such a data (processing) dependency relating to that rendering task can complete their processing.

Thus, in embodiments, when it is determined that the rendering task for the later rendering job has an active dependency on any of the rendering tasks currently being processed, an indication is provided in respect of the rendering task or tasks currently being processed that are causing the active dependency to indicate that the rendering task or tasks are causing an active dependency, and wherein when a rendering task for which such an indication is provided completes its processing, this is signalled to the processing cores of the graphics processor to trigger the processing cores to perform a (second or further) determination in relation to any rendering tasks whose processing has been stalled as to whether the dependency has cleared.

Various other arrangements would however be possible. For example, rather than triggering a broadcast as described above, or in addition to this, each processing (shader) core could instead be operable and configured to periodically check whether any blocked rendering tasks can be released. As another example, the task issuing circuit (task iterator) could track which rendering tasks are resulting in "active" data (processing) dependencies and communicate this to the processing (shader) cores when those rendering tasks complete their processing.

The effect and benefit of all this is therefore that when processing a rendering task for a second, later rendering job depends on a rendering task for the first, earlier rendering job, it can be determined using the record of which rendering tasks are currently being processed by the set of processing (shader) cores of the graphics processor whether the rendering task for the first, earlier rendering job on which processing of the rendering task for the second, later rendering job depends is currently being processed by a processing (shader) core of the graphics processor, and the processing of the rendering task for the second, later rendering job can be controlled accordingly to enforce the data (processing) dependency.

In an embodiment, in the event that there is a potential data (processing) dependency between a rendering task for a second, later rendering job and a rendering task for a first, earlier rendering job, the control of the rendering tasks for the second, later rendering job involves stalling the processing of the rendering task for the second, later rendering job until it can be determined that the rendering task for the first, earlier rendering job has completed its processing. Thus, in embodiments, when it is determined that the rendering task for the later rendering job has an active dependency on any of the rendering tasks currently being processed, the controlling processing comprises stalling at least some processing of the rendering task for the later rendering job until the rendering task or tasks on which its processing depends have completed their processing.

The control may however be performed in various suitable and desired ways, e.g., and in particular, depending on the type of data (processing) dependency.

For instance, the technology described herein may find particular utility for managing data (processing) dependencies in situations where the rendering tasks can only write to a particular output once ('write-once' operations). This is typically the case for tile-based rendering, for example, where each rendering task populates a respective entry in a tile buffer, which entry is then written (exactly) once to the frame buffer when the rendering task is complete.

In that case, as will be explained further below, the processing of a rendering task for a later rendering job may typically only need to be (and will only be) stalled pending completion of the rendering task (or rendering tasks) for the earlier rendering job upon which it potentially depends, but as soon as the corresponding rendering task (or tasks) for the earlier rendering job has completed, the rendering task can then be safely issued for processing (and processed).

For example, for 'read after write' data (processing) dependencies, where the later rendering job reads data from a buffer that is potentially written to by an earlier rendering job, the processing of rendering tasks for the later rendering job should be, and is, controlled to ensure that a given rendering task for the later rendering job is not performed until the corresponding (equivalent) rendering task for the earlier rendering job has completed its processing.

Various other arrangements would be possible.

The discussion above relates primarily to so-called 'read after write' data (processing) dependencies where rendering tasks for a later rendering job may need to read data that is written by an earlier rendering job.

The technology described herein can also be used to manage so-called 'write after write' data (processing) dependencies wherein the later rendering job may write to the same buffer that is written to by the earlier rendering job, such that any writes by rendering tasks for the later rendering job should again be delayed until the corresponding rendering tasks for the earlier rendering job have completed their writes, and which 'write after write' data (processing) dependencies can therefore be handled in generally the same manner as the 'read after write' data (processing) dependencies discussed above (i.e. using the 'task completion status' data structure of the technology described herein). The application requiring the graphics processor will typically specify such write operations in advance (and this is generally required by the API) and so the graphics processor can readily identify when such called 'write after write' data (processing) dependencies exist.

However, there may be other types of data (processing) dependencies that cannot be managed using the record of the technology described herein, or where it may otherwise be needed, or desired, to enforce a stricter (harder) processing barrier between rendering jobs. For example, this might be the case where a given output (buffer) associated with a particular rendering task may be overwritten by any other rendering task during the same rendering job, and so a rendering task for a later rendering job that requires data from that buffer cannot be safely performed until all of the rendering tasks for the earlier rendering job have completed their processing. In that case, the technology described herein may, e.g., and in an embodiment does, enforce a stricter (harder) processing barrier between rendering jobs, e.g. which could be done as in the more traditional approach described above.

A particular example of this would be when a rendering job includes so-called shader 'side effects' such as unconstrained load/store operations or atomic operations to shader storage buffer objects where any rendering task may read or write to any object in the shader storage buffer object. In this case the rendering job is not necessarily a write-once process for the shader storage buffer object output. Thus, if a subsequent rendering job has a data (processing) dependency on the shader storage buffer object, no rendering tasks for the subsequent rendering job can be issued for processing until all of the rendering tasks for the earlier rendering job have completed their processing (since any of the rendering tasks for the earlier rendering job could potentially write to the shader storage buffer object).

In that case, it may be necessary to enforce a stricter (harder) processing barrier between rendering jobs, and this is in an embodiment done. The presence of such 'side effects' can generally be, and in an embodiment is, identified by the compiler when generating a shader program. The compiler can thus add a suitable flag (e.g. a 'shader_has_side_effects' flag) to the shader program to signal the presence of such side effects. This signalling can thus be used by the graphics processor to identify instances where a stricter (harder) processing barrier needs to be enforced between rendering jobs and thus prevent the graphics processor from issuing any rendering tasks for the later rendering job for processing until all of the rendering tasks for the earlier rendering job including the side-effects have completed their processing.

Another example where it may be necessary to enforce a stricter (harder) processing barrier between rendering jobs may be for so-called 'write-after-read' dependencies where a later rendering job may overwrite a buffer that an earlier rendering job may need to read from. In that case, again, it may not be possible to determine which rendering tasks for the earlier rendering job may still need to read from that buffer at the point at which the corresponding rendering task for the later rendering job is issued, as read operations may typically not need to be specified in advance. In some cases it may be possible to identify and properly manage these 'write-after-read' dependencies, e.g., and in particular, if the application programmer provides enough information to do so.

However, this may not always be guaranteed, and so in some cases it may be preferable, or necessary, to simply enforce a stricter (harder) processing barrier between rendering jobs whenever such 'write-after-read' dependencies are identified (and this is in an embodiment therefore done). Again, these instances can generally be identified in advance, as it will typically be specified for a given rendering job which input/output buffers will be used and also the various access permissions (and API requirements typically mandate that this is done).

There are various other situations where the operation according to the technology described herein may not be appropriate, or desired, and so it may be beneficial to be able to fall back to a stricter (harder) processing barrier between rendering jobs.

In such cases, the control of the technology described herein may therefore be selectively disabled. That is, in some embodiments, the ability of the graphics processor to issue and process rendering tasks for separate rendering jobs concurrently in the processing (shader) cores may be selectively inhibited such that a stricter (harder) processing barrier can be enforced between rendering jobs when desired. In other words, there may be some situations where it is necessary (or desirable) to enforce a stricter (harder) processing barrier between rendering jobs, and in such situations, the operation according to the technology described herein may be selectively disabled.

For example, in some cases, the graphics processor may fall back to a strict (hard) processing barrier in which the graphics processor is prevented from issuing any rendering tasks for a later rendering job for processing until all of the rendering tasks for an earlier rendering job have completed their processing, e.g. as in the more traditional graphics processing arrangements mentioned above. However, it may also be possible to inhibit the particular mechanism of the technology described herein, but still allow at least some processing to be performed for rendering tasks for the later rendering job without having to strictly wait for all of the rendering tasks for the earlier rendering job to have completed their processing (and this may be done in some embodiments). For instance, in cases where a stricter (harder) processing barrier may need to be enforced between rendering jobs, it may still be possible to allow some processing for the later rendering job to be performed, e.g., and in particular, so long as the relevant memory accesses and/or shader programs for the later rendering job are not performed until all of the rendering tasks for the earlier rendering job have completed their processing.

Various arrangements would be possible in this regard.

The graphics processor may thus be selectively operated in the manner described above. Thus, in embodiments, the particular mechanism to permit rendering tasks for a later rendering job to be issued for processing concurrently with rendering tasks for an earlier rendering job according to the technology described herein may be selectively enabled/disabled, e.g., and in particular, for certain types of data (processing) dependencies where it may still be necessary to enforce a stricter (harder) processing barrier between rendering jobs. That is, in some embodiments, the ability of the graphics processor to issue and process rendering tasks for separate rendering jobs concurrently in the processing (shader) cores may be selectively inhibited such that a stricter (harder) processing barrier can be enforced between rendering jobs when desired.

In that case, any part of the operation according to the technology described herein may be selectively enabled/disabled, e.g. depending on the circumstances.

The technology described herein may generally find application in any suitable graphics processing system.

The technology described herein relates particularly to tile-based rendering systems in which a render output (e.g. a frame) is subdivided into plural rendering tiles for the purposes of rendering. In that case each rendering tile may and in an embodiment does correspond to a respective sub-region of the overall render output (e.g. frame) that is being generated. For example, a rendering tile may correspond to a rectangular (e.g. square) sub-region of the overall render output.

The technology described herein can be used for all forms of output that a graphics processing pipeline may be used to generate, such as frames for display, render-to-texture outputs, etc., The technology described herein can generally be used for both graphics and non-graphics (e.g. compute) workloads as well as mixed workloads.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows a typical computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

Figure 2:
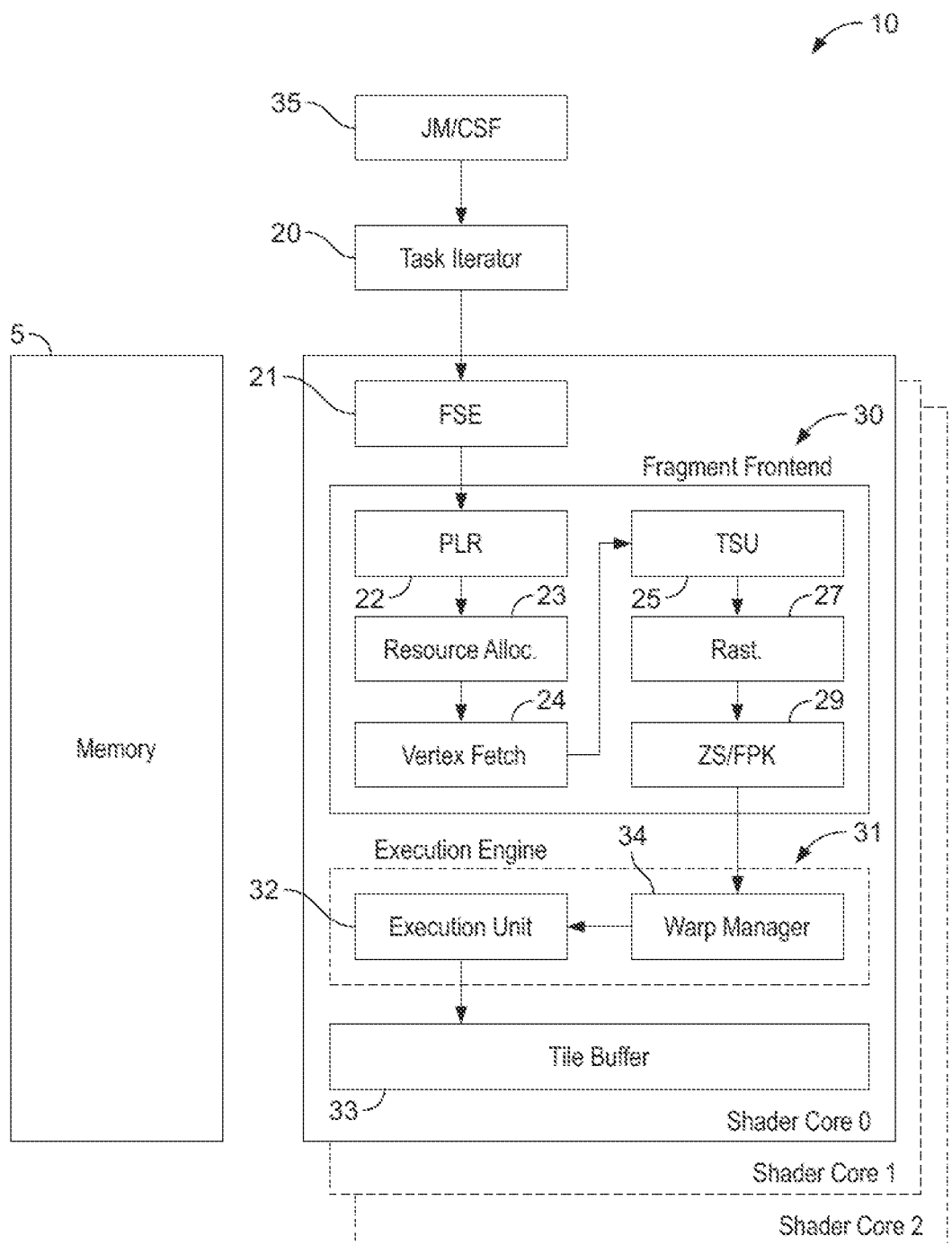
FIG. 2 shows schematically a graphics processing pipeline that can be operated in the manner of the technology described herein.

FIG. 2 shows an exemplary graphics processing pipeline 10 that may be executed by the graphics processor 3 according to an embodiment. The graphics processing pipeline 10 shown in FIG. 2 is a "tile-based" rendering system, and will thus produce tiles of an output data array, such as an output frame to be generated. Thus, an example will now be described in the context of "tile-based" rendering. In FIG. 2, the rendering is performed using rasterisation, as will be explained further below. However, it will be appreciated that the technology described herein is not necessarily limited to rasterisation-based rendering and may generally be used for other types of rendering, including ray tracing or hybrid ray tracing arrangements. Likewise, the technology described herein is not necessarily limited to tile-based rendering and may also be used for other types of rendering including immediate-mode rendering arrangements.

The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline 10 according to the present embodiments. As will be appreciated by those skilled in the art, there may be other elements of the graphics processing pipeline that are not illustrated in FIG. 2.

It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by the graphics processing unit (GPU) (graphics processor) 3, which will accordingly include the necessary functional units, processing circuits, etc., operable to execute the graphics processing pipeline stages.

(It will be appreciated that the graphics processing unit (GPU) (graphics processor) 3 may, and generally will, include various other functional units, processing circuits, etc., not shown in FIG. 2. This may include various functional units, processing circuits, etc., that are operable to execute non-graphics processing work. For example, in addition to graphics processing work, the graphics processing unit (GPU) (graphics processor) 3 may also be operable to perform general-purpose "compute" operations, and may therefore also include various functional units, processing circuits, etc., operable to execute such non-graphics processing work. Thus, although not shown in FIG. 2, the shader cores may for example, in addition to the fragment shader endpoint 21 that will be described below, also comprise a suitable "compute" shader endpoint that is operable and configured to issue compute tasks to the execution engine 31 for processing. The shader cores may, for example, also contain other suitable endpoints, as desired, that are operable and configured to issue other types of tasks to the execution engine 31 for processing. Various arrangements would be possible in this regard.)

FIG. 2 shows the stages of the graphics processing pipeline after a tiler (not shown) of the graphics processor has prepared the primitive lists (as the graphics processing pipeline 10 is a tile-based graphics processing pipeline).

(The tiler in effect determines which primitives need to be processed for different regions of the output. In the present embodiments, these regions may, e.g., represent a tile into which the overall output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.)

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first output, which may, e.g. be a frame to display. In the present embodiments, wherein the graphics processing pipeline 10 is a tile-based system, in which the output has been divided into a plurality of rendering tiles, the graphics processing pipeline 10 iterates over the set of tiles for the first output, rendering each tile in turn.

As shown in FIG. 2, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs to respective elements of the graphics processor and graphics processing pipeline 10, via an appropriate bus/interconnect.

Thus, as shown in FIG. 2, the job manager 35 will, inter alia, issue fragment processing tasks to the fragment task iterator 20 for the fragment task iterator 20 to then schedule the appropriate fragment shading tasks to and onto the graphics processing pipeline 10.

In the present embodiments, the graphics processing pipeline 10 is implemented by means of an appropriate processing ("shader") core. In particular, as shown in FIG. 2, the graphics processor 3 includes a plurality of "shader" cores that are each configured to implement a respective parallel instance of the graphics processing pipeline 10. Thus, the fragment task iterator 20 is operable to and configured to issue tasks to different ones of the of shader cores, e.g. to try to balance processing work between the different shader cores.

(Although not shown in FIG. 2, there may be various other task iterators that control the issuing of "compute" or other tasks, etc.)

As will be explained further below, each "shader" core includes a fragment "frontend" 30 that may be, and typically is, implemented in essentially fixed-function hardware, and that performs set up for the fragment shader programs, as well as a programmable stage (execution engine 31) that executes the fragment shader programs to perform the actual rendering.

When a rendering task (i.e. tile) is allocated to a given shader core for processing, the tile is then processed (rendered) accordingly, i.e. by the graphics processing pipeline 10.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

The edge information for the re-ordered primitives is then passed to the rasteriser 27, which rasterises the primitives into a set of one or more sampling positions and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

Fragments that pass the fragment early Z and stencil test stage 29 may then be subject to further culling operations, such as a 'forward pixel kill' test, e.g. as described in United States Patent Application Publication No. 2019/0088009 (Arm Limited), before the remaining fragments are then passed to a fragment shading stage, in the form of an execution engine 31, for rendering.

The processing stages including the primitive list reader (or 'polygon list reader') 22 up to the (early) depth (Z)/stencil testing 29 thus together constitute a fragment "frontend" 30 that serves to set up the required data for the fragment processing operations to be performed by the execution engine 31.

The execution engine 31 then performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

Thus, as shown in FIG. 2, in the present embodiment, the execution engine 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the programmable execution unit 32, and the issuing of thread groups to the programmable execution unit 32 for the execution of the fragment shading programs by respective thread groups.

As shown in FIG. 2, the programmable execution unit 32 is also in communication with the memory 5.

Once the fragment shading is complete, the output rendered (shaded) fragment data is written to the tile buffer 33 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling position that the buffers represent (in essence for each sampling position of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multi-sampling is being used).

As mentioned above, the tile buffer 33 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

For a given output (e.g. frame (image) to be displayed) the graphics processor will perform at least one render pass to generate the output. In general, the generation of a given output (e.g. frame (image) to be displayed) may however involve a sequence of plural render passes (with each render pass comprising potentially plural rendering jobs to be performed). This may for example include a first render pass that generates an "intermediate" output (e.g. such as a "render to texture" output) which is then followed by a second render pass that consumes the output from the first render pass when generating its own output (which may be the "final" output (e.g. frame (image) to be displayed)).

Thus, a typical command stream for the tile-based graphics processor may include commands to perform a sequence of render passes, e.g. as follows:
RUN_FRAG_0
RUN_FRAG_1
...
with each RUN_FRAG command corresponding to a respective fragment processing (rendering) job that is to be performed using the graphics processing pipeline.

(Note that although not shown in this example a render pass for producing a particular render output (e.g. frame) may generally comprise various different types of rendering jobs, such that a fragment processing (rendering) job within a render pass may also be followed by other types of rendering jobs that relate to the same render output. An example of this might be when a "compute" job is used to calculate 'mist' effects for a respective render output produced by a fragment processing (rendering) job. Thus, a command stream may generally also contain various other types of commands for performing other types of rendering jobs, as desired.)

Although each fragment processing (rendering) job represents a separate instance of implementing the graphics processing pipeline, there may be various data (processing) dependencies between different rendering jobs being performed. For example, in the case that one rendering job generates an "intermediate" output that is to be consumed by the next rendering job, the later rendering job should generally not be performed until the earlier rendering job has been performed. More precisely, in the case of a tile-based rendering system, where a later rendering job has a data (processing) dependency on an earlier rendering job, a particular rendering task for rendering a given tile for the later rendering job should not be performed until the equivalent tile for the earlier rendering job has been processed, so that the required portion of the render output associated with that rendering tile is available.

Thus, as mentioned above, each rendering job generally comprises a plurality of rendering tasks which may, e.g., and in the present embodiments do, correspond to respective rendering tiles into which the output (render target) for the render pass is subdivided for rendering purposes. The command stream including the RUN_FRAG commands may thus be received by the job manager circuit (a command stream frontend circuit) 35, which identifies the rendering jobs to be performed, which rendering jobs are then broken down into respective smaller rendering tasks (e.g. tiles) that are provided to the fragment task iterator 20 for the fragment task iterator 20 to then schedule the appropriate fragment shading tasks to and onto the graphics processing pipeline 10. (The rendering tasks may then be further broken down into smaller work items within the shader core.)

In order to ensure that any data (processing) dependencies between rendering jobs are enforced, the job manager circuit (a command stream frontend circuit) 35 may in some more traditional graphics processing arrangements enforce a strict (hard) processing barrier between rendering jobs (which barrier may be, and traditionally is, enforced between fragment processing (rendering) jobs for different render passes, but also between different types of rendering jobs within the same render pass), e.g. such that in the example given above all of the rendering tasks associated with the RUN_FRAG_0 command would be issued and processed to completion before the job manager circuit (a command stream frontend circuit) 35 permitted any rendering tasks associated with the RUN_FRAG_1 command to be issued for processing.

Figure 3:
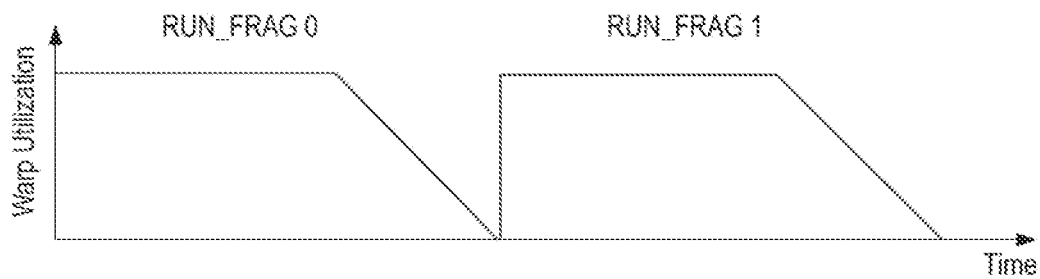
FIG. 3 illustrates a more traditional graphics processor operation in which strict processing barriers are enforced between separate rendering jobs.

This more traditional graphics processor operation is illustrated in FIG. 3. This approach works well to ensure safe graphics processing operation. However, as depicted in FIG. 3, especially towards the end of the rendering jobs, there is relatively lower warp utilisation. This is because towards the end of the rendering job, there may be fewer rendering tasks to be performed compared to the number of available shader cores. (Although not shown in FIG. 3, note that there may typically also be relatively lower warp utilisation during an initial ramp-up period). However, because of the hard (strict) processing barrier between rendering jobs, the job manager circuit (a command stream frontend circuit) 35 cannot start to issue rendering tasks for the next rendering job for processing, and so any shader cores that have completed their processing may sit idle for a number of cycles waiting for the other shader cores to finish processing their respective rendering tasks.

Figure 4:
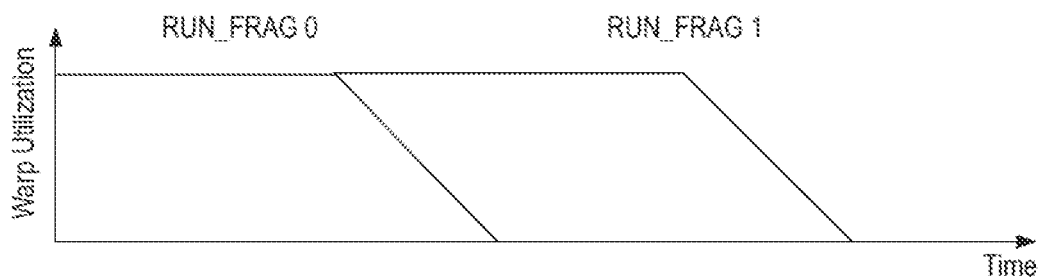
FIG. 4 illustrates an improved graphics processor operation according to embodiments of the technology described herein in which separate rendering jobs can overlap.

The present embodiments thus provide a mechanism for safely allowing separate rendering jobs to be issued for processing, and processed, concurrently, e.g. using different shader cores (although the processing could also be performed concurrently on the same shader core, e.g. so long as forward progress of the earlier rendering job can be guaranteed). This improvement is illustrated in FIG. 4, which shows that towards the end of the first rendering job (RUN_FRAG_0), the shader cores are permitted to start processing rendering tasks for the next rendering job (RUN_FRAG_1), such that the processing of rendering tasks for different rendering jobs is allowed to overlap across different shader cores, hence increasing the overall shader core utilisation.

In particular, to do this, and ensure that any data dependencies between rendering jobs can still be enforced as needed, the present embodiments maintain a record of which rendering tasks are currently being processed by the graphics processor shader cores, which record can then be used, as will be explained further below, to determine whether any given rendering task may need to be stalled, e.g. since it has an "active" data dependency on another rendering task that is currently being processed.

Figure 5:
FIG. 5 shows an example of a so-called 'read-after-write' dependency between two render passes.

For instance, FIG. 5 shows an example of a so-called 'read-after-write' dependency between two render passes, where the later render pass (RenderPass2) needs to read data from render targets (ImageA and ImageB) that are written to be the earlier render pass (RenderPass1).

In this situation, the rendering tasks for the later render pass (RenderPass2) should therefore not be processed until the processing of the corresponding rendering tasks for the earlier render pass (RenderPass1) is complete, i.e. so that the relevant portions of the render targets have been written accordingly by the earlier render pass prior to the later render pass reading those portions.

Figure 6:
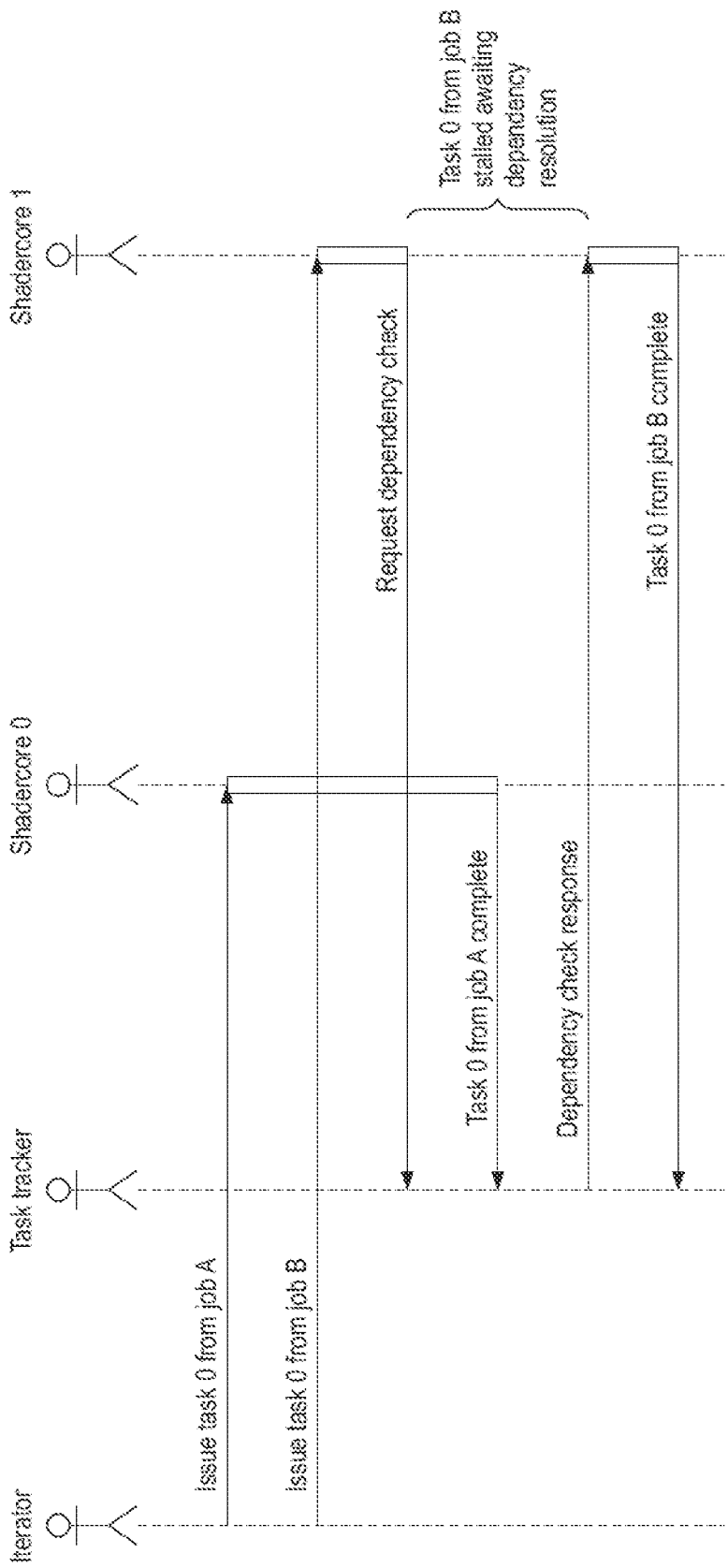
FIG. 6 illustrates a graphics processor operation according to an embodiment.

FIG. 6 illustrates a graphics processor operation according to an embodiment. In particular, as shown in FIG. 6, a 'task tracker' unit is included within the task iterator 20. This can be used, as will be explained further below, to manage potential dependencies between rendering tasks that are being executed within (different) shader cores.

For instance, as mentioned above, when the task iterator 20 receives a rendering job it will break the rendering job up into one or more rendering tasks and issue these rendering tasks to the shader cores for processing. Within a rendering task there is information allowing the shader core to determine if a memory access made by the task might be to a data buffer (render target) which is still being worked on by previous tasks from previous rendering jobs. This information could be in the form of an array of an array of base addresses indicating which regions of the data buffer (render target) may need to be accessed by the rendering task, but could also comprise a Bloom filter, for example, representing the likely regions of the data buffer (render target) may need to be accessed by the rendering task. Various arrangements would be possible in this regard.

Figure 7:
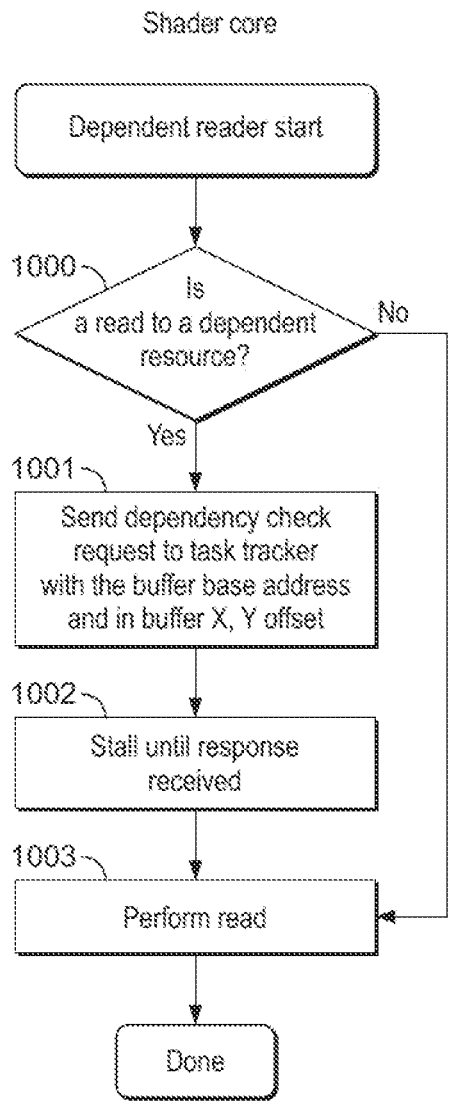
FIG. 7 is a flow chart illustrating in more detail the shader core operation according to an embodiment when a potential dependency is encountered.

FIG. 7 is a flow chart illustrating in more detail the shader core operation according to an embodiment when a potential dependency is encountered when processing a rendering task. As shown in FIG. 7, when the task requires a memory access which might be to a data buffer (render target) which older rendering jobs might be working on, the base address of this data buffer (render target) is checked against the information provided with the rendering task (step 1000). If this check shows that the data buffer (render target) is not one that is still being worked on by any other rendering jobs (step 1000—no), the read can then be performed immediately, and so this is done (step 1003). Otherwise, if the rendering task requires access to a data buffer (render target) which older rendering jobs might still be working on (step 1000—yes), a request for a dependency check is sent to the 'task tracker' unit (which resides within the iterator 20) (step 1001) and the rendering task will stall within the shader core until a response is received from the 'task tracker' unit indicating that the dependency is clear (step 1002) (at which point the read can then be performed (step 1003)).

Figure 8:
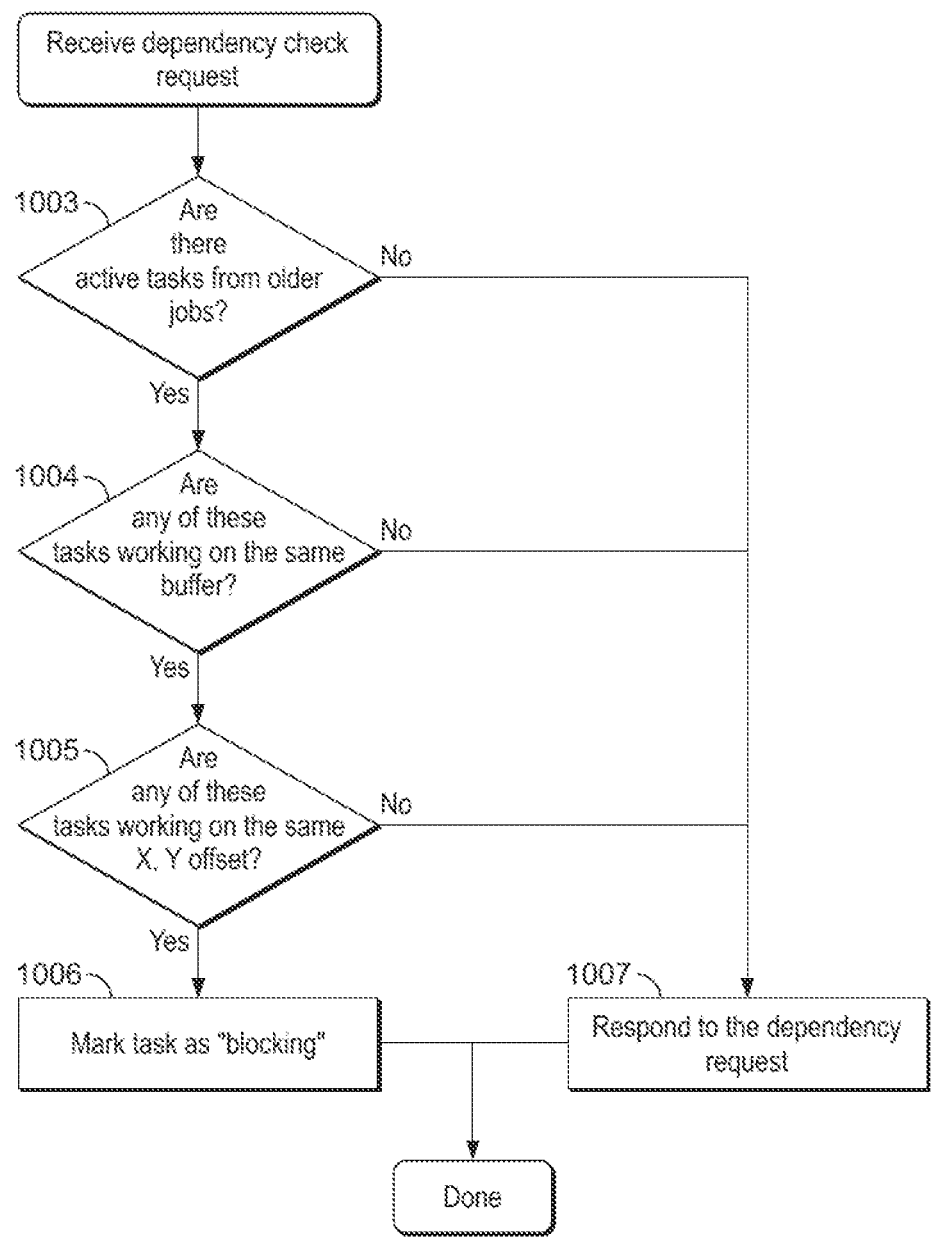
FIG. 8 is a flow chart illustrating a dependency managing operation according to an embodiment.

FIG. 8 is a corresponding flow chart illustrating the dependency managing operation performed within the 'task tracker' unit according to an embodiment in response to receiving a request for a dependency check (e.g. in response to step 10001 in FIG. 7). When the 'task tracker' unit receives the dependency check request, it first checks whether there are any tasks active from older rendering jobs (step 1004) that are currently being processed (step 1004). This is done by comparing the age of the rendering job that the requesting task came from with the age of all of the rendering jobs with active tasks. If there no older rendering jobs, there can be no active dependencies, and so a response can be (and is) sent immediately to the dependency request (step 1007) to allow the read to be performed. On the other hand, if there are active tasks from older jobs, the base address sent in the request is compared with the buffer information in the older job(s) to see if the older job(s) might be working on the same data buffer (render target) as the rendering task for which the dependency check is being made. If not, then a response to the dependency request is sent at that point (step 1007) to allow the read to be performed. Otherwise, if there is a possible active dependency, i.e. the older tasks are working on the same buffer, the offset indicating the portion of the buffer that the task is working on is checked to see if this matches the offset in the dependency check (step 1005). If the tasks are working on different portions of the buffer, the read can be safely performed and so a response to the dependency request can be sent at this point (and so this is done-step 1007). Otherwise, if the tasks are working on the same portions of the same buffer, there is an active data dependency that must be enforced, and so the rendering task that is causing the dependency is marked as "blocking" (step 1006), and the rendering task for which the dependency check was being made remains stalled (i.e. step 1002 in FIG. 7).

Figure 9:
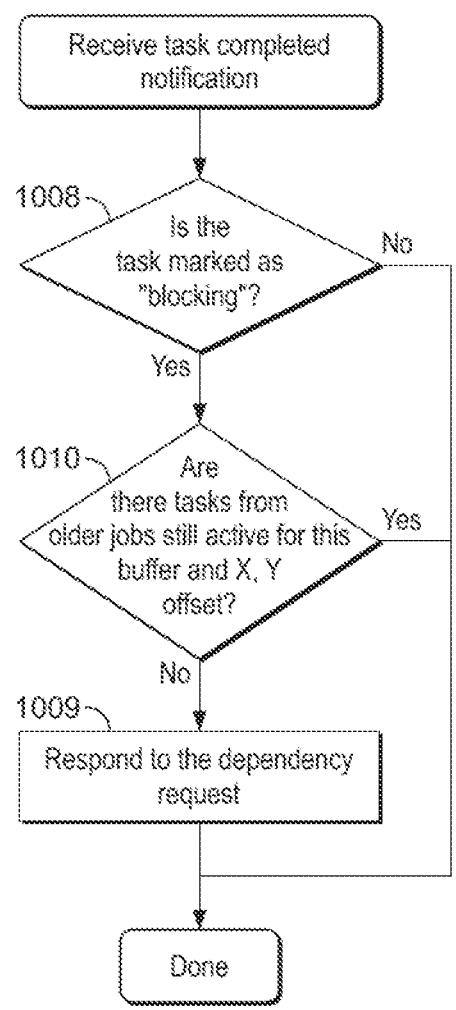
FIG. 9 is a flow chart illustrating further details of the dependency managing operation according to an embodiment.

When a rendering task completes in a shader core, the 'task tracker' unit then checks if the "blocking" bit is set for that rendering task (step 1008). If so, the 'task tracker' unit checks if there are any other tasks from older rendering jobs (than the rendering job which requested the dependency check) that are still causing active dependencies (step 1010). In this respect note that in general there may be any number of rendering jobs being performed concurrently and so even if a dependency on one rendering job has completed there may still be other active dependencies to other rendering jobs that still need to be enforced. So long as there are no other active dependencies (step 1010—no), a response is sent at this point to the shader core with the still pending dependency request (step 1009) to unblock that task and allow the read to be performed. Otherwise, if there are other active dependencies, the task remains blocked until all active tasks on which it's processing depends have completed. This operation for tracking when dependencies are met is shown in FIG. 9.

Regardless as to which stage the dependency response came from once it's received by originating task the stall (i.e. at step 1002 in FIG. 7) is resolved and the read (step 1003 in FIG. 7) is permitted to happen.

Figure 10:
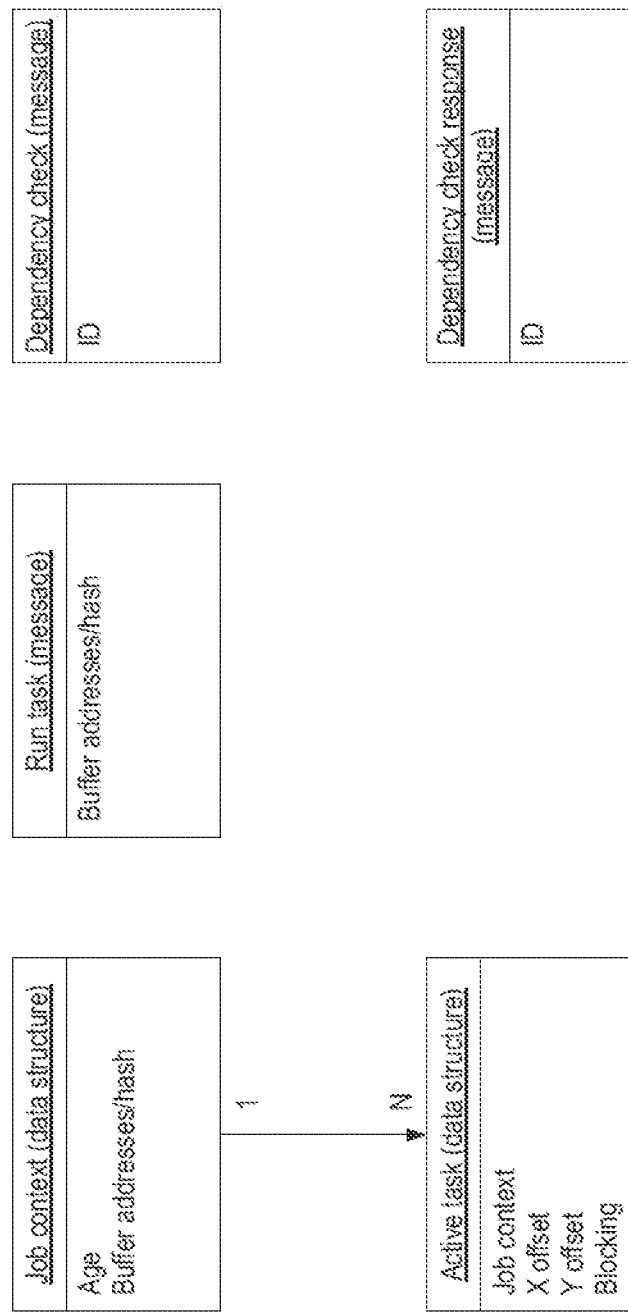
FIG. 10 shows schematically the data structures and messages that may be used for the dependency managing operation according to embodiments.

FIG. 10 shows schematically the data structures and messages that may be used for the dependency managing operation according to embodiments.

The job context is a structure which is created/setup when a job is started. The age could be provided with the rest of the job state vector from the job manager circuit (a command stream frontend circuit) 35 or could be sampled from an auto-incrementing ID within the iterator 20 which increments when a new job is started. The buffer address/hash will be provided with the job state vector.

The active task structure is created/setup when the iterator 20 is about to issue a task to a shader core and contains the offset the task is working on (which in this example is defined in terms of (x, y) co-ordinates but in general the data buffer (render target) may be divided into any suitable number of dimensions as desired in which case the active task structure may correspondingly contain the appropriate number of parameters for identifying the portion of the buffer that the task is working on). The active task structure also includes in respect of the task a bit indicating if it is blocking a dependency response which bit is initialized to 0/false. There is a 1: N relationship between job contexts and active tasks and the job context can be obtained from the active task.

The run task message is what is sent to the shader core when a task is issued to it (e.g. as would normally be done). However, in the present embodiments the buffer address/hash is also added to the run task message.

The dependency check message is what the shader core sends to the task tracker and simply contains the task ID so a later response can be associated with it (as there could be multiple active dependency requests from the same core). The dependency check response message is what the task tracker sends to the core once the dependency is resolved, and again contains the task ID to allow the appropriate task to be unblocked.

In this way, it is possible to manage any possible dependencies between rendering tasks for different rendering jobs that may be running concurrently across the graphics processor shader cores.

FIG. 5 above shows an example of a so-called 'read-after-write' dependency between two render passes, which 'read-after-write' dependency can be handled as described above.

Figure 11:
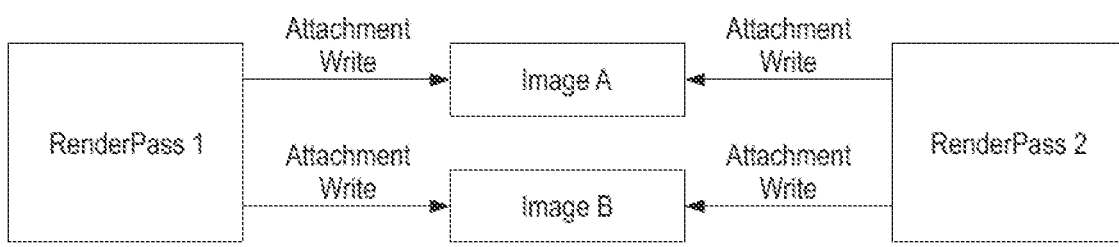
FIG. 11 shows an example of a so-called 'write-after-write' dependency between two render passes.

FIG. 11 shows an example of a so-called 'write-after-write' dependency between two render passes, where the later render pass overwrites a render target that is also written to by the earlier render pass. These dependencies can generally be handled similarly to the 'read-after-write' dependencies illustrated in FIG. 5, using the techniques described above.

However, it will be appreciated that there may be other situations, or types of dependencies, that cannot be handled in this way.

Figure 12:
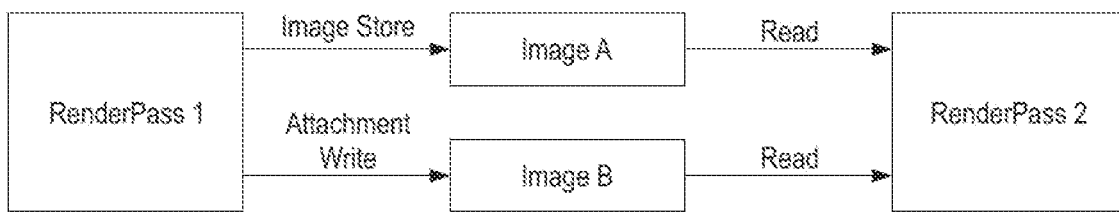
FIG. 12 shows an example of a shader side effect that may be present within a render pass.

An example where the job manager circuit (a command stream frontend circuit) 35 may need to enforce a hard processing barrier may be where a render pass includes 'side effects'. An example of this is shown in FIG. 12 where the earlier render pass performs an 'Image Store' operation for a render target (ImageA) that is to be read by the later render pass. This Image Store operation may be present within any arbitrary one of the rendering tasks for the earlier render pass, and this may not be known in advance, and so it is not generally safe to start processing the later render pass in this situation until all of the rendering tasks for the earlier render pass have completed.

Another example of this might be a 'write-after-read' dependency where a rendering job for a later render pass may write to a render target (image) that a rendering job for an earlier render pass potentially needs to read from. In that case, the read operations may generally be unconstrained such that a read may be performed as part of any one of the rendering tasks for the rendering job for the earlier render pass. In that case, it may be not be safe to start issuing any rendering tasks for the later render pass, and a hard processing barrier may therefore be enforced by the job manager circuit (a command stream frontend circuit) 35.

Various other examples would be possible.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor when performing a sequence of rendering jobs, wherein each rendering job in the sequence of rendering jobs comprises a respective set of one or more rendering tasks to be processed to generate an overall output for the rendering job, and wherein at least some processing of a rendering task for a later rendering job in the sequence of rendering jobs may depend on processing of a rendering task for an earlier rendering job in the sequence of rendering jobs, the method comprising:

when performing a sequence of rendering jobs, wherein the sequence of rendering jobs is performed in serial order such that all of the rendering tasks for an earlier rendering job in the sequence of rendering jobs are issued for processing before any of the rendering tasks for a later rendering job in the sequence of rendering jobs:

issuing rendering tasks for a later rendering job in the sequence of rendering jobs to a set of one or more processing cores of the graphics processor for processing concurrently with rendering tasks for an earlier rendering job in the sequence of rendering jobs; and maintaining a record of which rendering tasks are currently being processed by the set of processing cores of the graphics processor; and when processing a rendering task for a later rendering job, determining using the record of which rendering tasks are currently being processed by the set of processing cores of the graphics processor whether processing of the rendering task for the later rendering job depends on any of the rendering tasks that are currently being processed by the set of processing cores of the graphics processor, and controlling processing of the rendering task for the later rendering job based on such determination, wherein the determining whether processing of the rendering task for the later rendering job depends on any of the rendering tasks that are currently being processed by the set of processing cores of the graphics processor comprises: identifying whether the later rendering job has a potential dependency on any earlier rendering job for which one or more rendering tasks are currently being processed.

2. The method of claim 1, wherein the graphics processor includes plural processing cores, and wherein a respective record is maintained in respect of each processing core of which rendering tasks the processing core is currently processing.

3. The method of claim 1, wherein identifying whether the later rendering job has a potential dependency on any earlier rendering job for which one or more rendering tasks are currently being processed comprises identifying whether there is any overlap between a set of data buffers that the later rendering job may need to access and a set of data buffers that the earlier rendering job may need to write to.

4. The method of claim 1, wherein the determining whether processing of the rendering task for the later rendering job depends on any of the rendering tasks that are currently being processed by the set of processing cores of the graphics processor further comprises: when it is identified that the later rendering job has a potential dependency on an earlier rendering job for which one or more rendering tasks are currently being processed: identifying whether the rendering task for the later rendering job depends on any of the one or more rendering tasks that are currently being processed for the earlier rendering job.

5. The method of claim 4, wherein identifying whether the rendering task for the later rendering job depends on any of the one or more rendering tasks that are currently being processed for the earlier rendering job comprises identifying whether the rendering task for the later rendering job potentially accesses a same portion of a data buffer that a rendering task for the earlier rendering job also potentially accesses.

6. The method of claim 1, wherein when it is determined that the rendering task for the later rendering job has an active dependency on any of the rendering tasks currently being processed, the controlling processing comprises stalling at least some processing of the rendering task for the later rendering job until the rendering task or tasks on which its processing depends have completed their processing.

7. The method of claim 1, wherein the determining whether processing of the rendering task for the later rendering job depends on any of the rendering tasks that are currently being processed by the set of processing cores of the graphics processor is performed by a task issuing circuit of the graphics processor that controls the issuing of rendering tasks to the processing cores.

8. The method of claim 7, wherein when the rendering task requires a memory access, the processing core at that point messages the task issuing circuit to determine whether the memory access depends on any of the rendering tasks that are currently being processed by the set of processing cores of the graphics processor, with the task issuing circuit returning a result of the determination to the processing core to control processing of the rendering task.

9. The method of claim 7, wherein when it is determined that the rendering task for the later rendering job has an active dependency on any of the rendering tasks currently being processed, an indication is provided in respect of the rendering task or tasks currently being processed that are causing the active dependency to indicate that the rendering task or tasks are causing an active dependency, and wherein when a rendering task for which such an indication is provided completes its processing, this is signalled to the processing cores of the graphics processor to trigger the processing cores to perform a determination in relation to any rendering tasks whose processing has been stalled as to whether the dependency has cleared.

10. A graphics processor comprising:
a set of one or more processing cores;
a task issuing circuit operable to control the issuing of rendering tasks to the plural processing cores for processing; and
a control circuit operable and configured to:
when the graphics processor is performing a sequence of rendering jobs, wherein the sequence of rendering jobs is performed in serial order such that all of the rendering tasks for an earlier rendering job in the sequence of rendering jobs are issued for processing before any of the rendering tasks for a later rendering job in the sequence of rendering jobs, and wherein each rendering job in the sequence of rendering jobs comprises a respective set of one or more rendering tasks to be processed to generate an overall output for the rendering job, wherein the processing of a rendering task for a later rendering job in the sequence of rendering jobs may depend on the processing of a rendering task for an earlier rendering job in the sequence of rendering jobs:
control the operation of the graphics processor to:
cause the task issuing circuit to issue rendering tasks for a later rendering job in the sequence of rendering jobs to a set of one or more processing cores of the graphics processor for processing concurrently with rendering tasks for an earlier rendering job in the sequence of rendering jobs; and
the control circuit further configured to:
maintain a record of which rendering tasks are currently being processed by the set of processing cores of the graphics processor; and
determine using the record of which rendering tasks are currently being processed by the set of processing cores of the graphics processor whether processing of a rendering task for the later rendering job depends on any of the rendering tasks that are currently being processed by the set of processing cores of the graphics processor, and control processing of the rendering task for the later rendering job based on such determination,
wherein the control circuit is configured to, when determining whether processing of a rendering task for a later rendering job depends on any of the rendering tasks that are currently being processed by the set of processing cores of the graphics processor: identify whether the later rendering job has a potential dependency on any earlier rendering job for which one or more rendering tasks are currently being processed.

11. The graphics processor of claim 10, wherein the graphics processor includes plural processing cores, and wherein a respective record is maintained in respect of each processing core of which rendering tasks the processing core is currently processing.

12. The graphics processor of claim 10, wherein identifying whether a later rendering job has a potential dependency on any earlier rendering job for which one or more rendering tasks are currently being processed comprises identifying whether there is any overlap between a set of data buffers that the later rendering job may need to access and a set of data buffers that the earlier rendering job may need to write to.

13. The graphics processor of claim 10, wherein the control circuit is configured to: when it is identified that a later rendering job has a potential dependency on an earlier rendering job for which one or more rendering tasks are currently being processed: identify whether a rendering task for the later rendering job depends on any of the one or more rendering tasks that are currently being processed for the earlier rendering job.

14. The graphics processor of claim 13, wherein identifying whether the rendering task for the later rendering job depends on any of the one or more rendering tasks that are currently being processed for the earlier rendering job comprises identifying whether the rendering task for the later rendering job potentially accesses a same portion of a data buffer that a rendering task for the earlier rendering job also potentially accesses.

15. The graphics processor of claim 10, wherein when it is determined that the rendering task for the later rendering job has an active dependency on any of the rendering tasks currently being processed, the control circuit is configured to stall at least some processing of the rendering task for the later rendering job until the rendering task or tasks on which its processing depends have completed their processing.

16. The graphics processor of claim 10, wherein the determining whether processing of the rendering task for the later rendering job depends on any of the rendering tasks that are currently being processed by the set of processing cores of the graphics processor is performed by the task issuing circuit of the graphics processor.

17. The graphics processor of claim 16, wherein when the rendering task requires a memory access, the processing core is configured at that point to message the task issuing circuit to determine whether the memory access depends on any of the rendering tasks that are currently being processed by the set of processing cores of the graphics processor, with the task issuing circuit configured to return a result of the determination to the processing core to control processing of the rendering task.

18. The graphics processor of claim 16, wherein when it is determined that the rendering task for the later rendering job has an active dependency on any of the rendering tasks currently being processed, an indication is provided in respect of the rendering task or tasks currently being processed that are causing the active dependency to indicate that the rendering task or tasks are causing an active dependency, and wherein when a rendering task for which such an indication is provided completes its processing, this is signalled to the processing cores of the graphics processor to trigger the processing cores to perform a determination in relation to any rendering tasks whose processing has been stalled as to whether the dependency has cleared.

19. A graphics processor comprising:
a set of one or more processing cores;
a task issuing circuit operable to control the issuing of rendering tasks to the plural processing cores for processing; and
a control circuit operable and configured to:
when the graphics processor is performing a sequence of rendering jobs, wherein the sequence of rendering jobs is performed in serial order such that all of the rendering tasks for an earlier rendering job in the sequence of rendering jobs are issued for processing before any of the rendering tasks for a later rendering job in the sequence of rendering jobs, and wherein each rendering job in the sequence of rendering jobs comprises a respective set of one or more rendering tasks to be processed to generate an overall output for the rendering job, wherein the processing of a rendering task for a later rendering job in the sequence of rendering jobs may depend on the processing of a rendering task for an earlier rendering job in the sequence of rendering jobs:
control the operation of the graphics processor to:
cause the task issuing circuit to issue rendering tasks for a later rendering job in the sequence of rendering jobs to a set of one or more processing cores of the graphics processor for processing concurrently with rendering tasks for an earlier rendering job in the sequence of rendering jobs; and
the control circuit further configured to:
maintain a record of which rendering tasks are currently being processed by the set of processing cores of the graphics processor; and
determine using the record of which rendering tasks are currently being processed by the set of processing cores of the graphics processor whether processing of a rendering task for the later rendering job depends on any of the rendering tasks that are currently being processed by the set of processing cores of the graphics processor, and control processing of the rendering task for the later rendering job based on such determination,
wherein the determining whether processing of the rendering task for the later rendering job depends on any of the rendering tasks that are currently being processed by the set of processing cores of the graphics processor is performed by the task issuing circuit of the graphics processor, and
wherein when the rendering task requires a memory access, the processing core is configured at that point to message the task issuing circuit to determine whether the memory access depends on any of the rendering tasks that are currently being processed by the set of processing cores of the graphics processor, with the task issuing circuit configured to return a result of the determination to the processing core to control processing of the rendering task.

* * * * *